(12) United States Patent
Shen et al.

(10) Patent No.: US 10,833,469 B2
(45) Date of Patent: Nov. 10, 2020

(54) PHOTONIC MOLECULE LASER

(71) Applicants: Jung-Tsung Shen, St. Louis, MO (US); Lihong Wang, St. Louis, MO (US)

(72) Inventors: Jung-Tsung Shen, St. Louis, MO (US); Lihong Wang, St. Louis, MO (US)

(73) Assignee: Washington University, St Louis, MO (US)

( * ) Notice: Subject to any disclaimer, the term of this patent is extended or adjusted under 35 U.S.C. 154(b) by 130 days.

(21) Appl. No.: 16/158,898

(22) Filed: Oct. 12, 2018

(65) Prior Publication Data

US 2019/0115714 A1 Apr. 18, 2019
US 2020/0220315 A9 Jul. 9, 2020

Related U.S. Application Data

(60) Provisional application No. 62/572,092, filed on Oct. 13, 2017.

(51) Int. Cl.
*H01S 3/067* (2006.01)
*H01S 3/10* (2006.01)
(Continued)

(52) U.S. Cl.
CPC ........ *H01S 3/06716* (2013.01); *H01S 3/0635* (2013.01); *H01S 3/10023* (2013.01);
(Continued)

(58) Field of Classification Search
CPC .............. H01S 3/06716; H01S 3/0635; H01S 3/10023; H01S 3/168; H01S 3/0637;
(Continued)

(56) References Cited

U.S. PATENT DOCUMENTS 7,974,534 B2 * 7/2011 Weiner .................. H04B 10/00
398/149
8,890,088 B2 11/2014 Cheng et al.
(Continued)

OTHER PUBLICATIONS

Firstenberg et al., "Attractive photons in a quantum nonlinear medium," Nature 502: 71-76 (2013).
(Continued)

*Primary Examiner* — Armando Rodriguez
(74) *Attorney, Agent, or Firm* — Armstrong Teasdale LLP

(57) ABSTRACT

A photonic molecule laser is described that includes a photonic molecule waveguide coupled to a photonic molecule seeding source configured to deliver a plurality of photonic molecules. The photonic molecule waveguide includes a second dopant maintained at a population inverted state with an energy level transition corresponding to a second frequency that is an N-fold multiple of a first frequency and amplifies the number of photonic molecules via stimulated emission. The photonic molecule seeding source includes a waveguide with a first dopant maintained at a population inverted state with an energy level transition corresponding to the first frequency. A pump source is coupled to the waveguide configured to deliver a first frequency laser pulse with pulse coherence time less than the photonic molecules correlation time. Each photonic molecule includes a threshold bound state of N first frequency photons, and each photonic molecule has the second frequency.

16 Claims, 54 Drawing Sheets
(52 of 54 Drawing Sheet(s) Filed in Color)

(51) Int. Cl.
H01S 3/063 (2006.01)
H01S 3/16 (2006.01)
H01S 3/094 (2006.01)
H01S 3/17 (2006.01)

(52) U.S. Cl.
CPC ............ *H01S 3/168* (2013.01); *H01S 3/0637* (2013.01); *H01S 3/094038* (2013.01); *H01S 3/094076* (2013.01); *H01S 3/1608* (2013.01); *H01S 3/176* (2013.01)

(58) Field of Classification Search
CPC ......... H01S 3/094038; H01S 3/094076; H01S 3/1608; H01S 3/176; H01S 3/067; H01S 3/06708; H01S 2302/00
See application file for complete search history.

(56) References Cited

U.S. PATENT DOCUMENTS

| | | | |
|---|---|---|---|
| 2009/0035528 A1 | 2/2009 | Leatherdale et al. | |
| 2010/0029323 A1 | 2/2010 | Tasic et al. | |
| 2012/0269212 A1* | 10/2012 | Harter ................ | H01S 3/06754 372/6 |

OTHER PUBLICATIONS

Shen et al., "Strongly correlated two-photon transport in a one-dimensional waveguide coupled to a two-level system," Physical Review Letters 98(15): 153003(4) (2007).

Shen et al., "Photonic-Fock-state scattering in a waveguide-QED system and their correlation functions," Physical Review A 92(3), 033803(17) (2015).

* cited by examiner

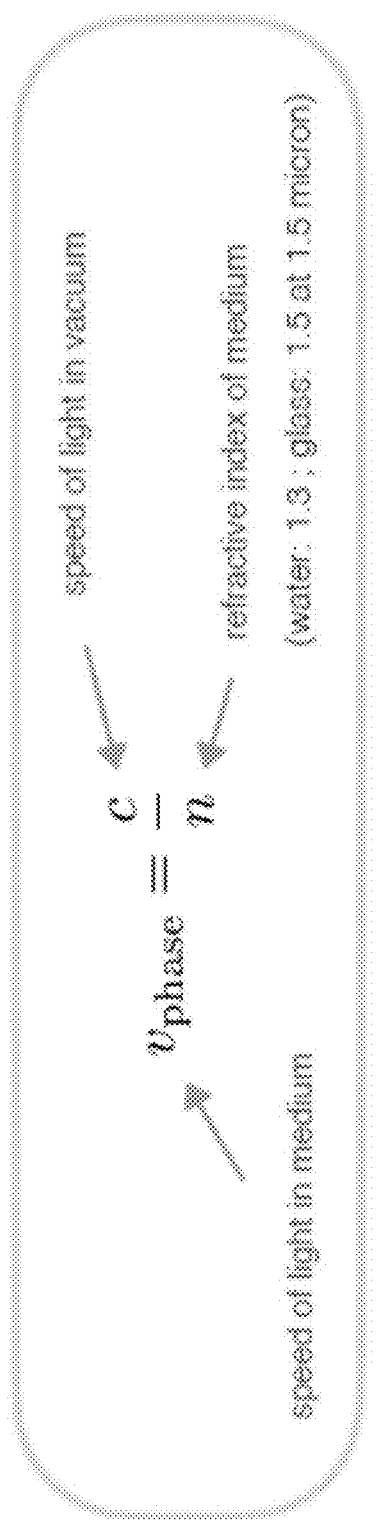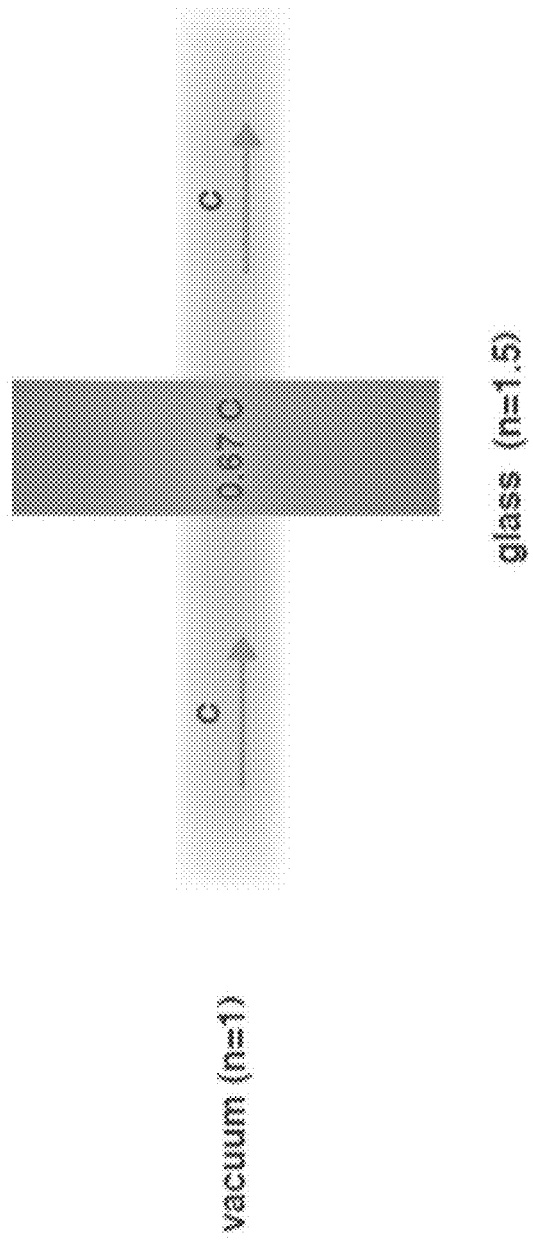
FIG. 15

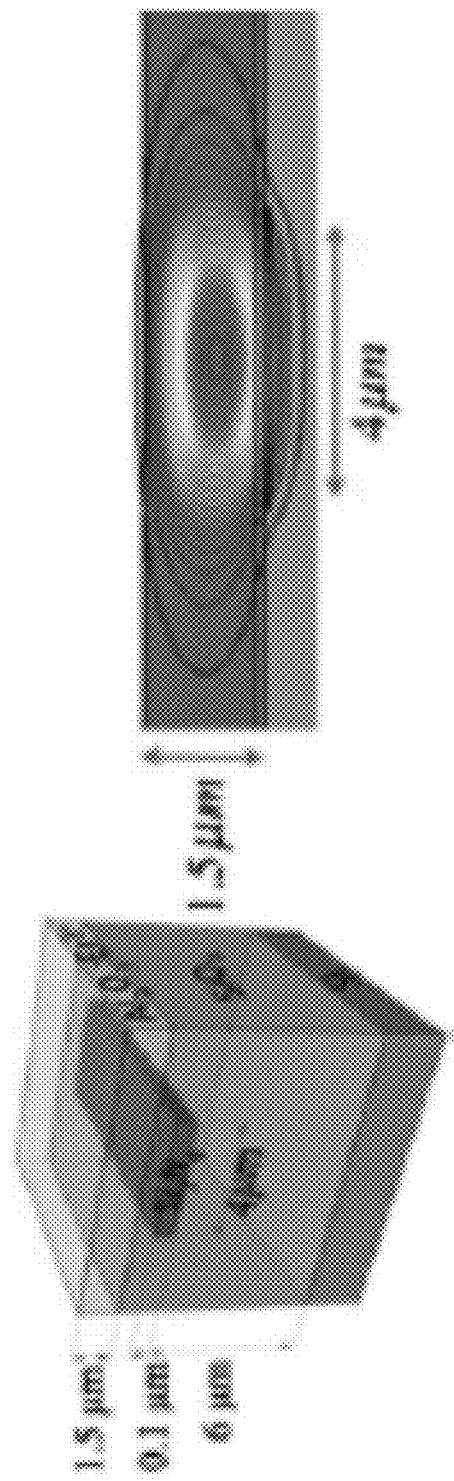

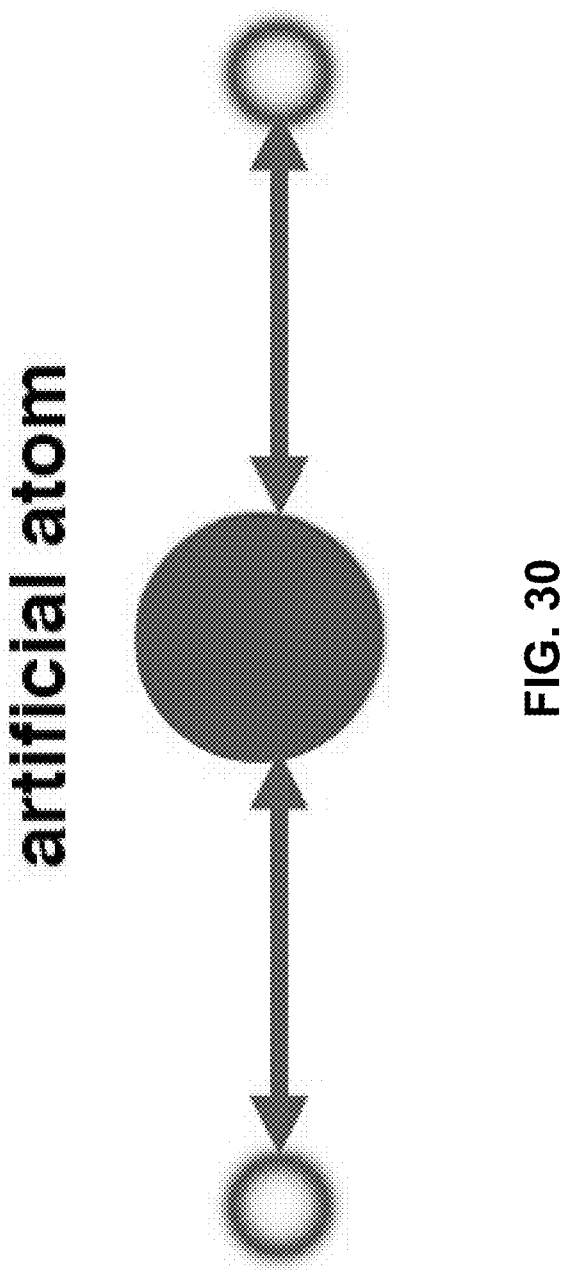

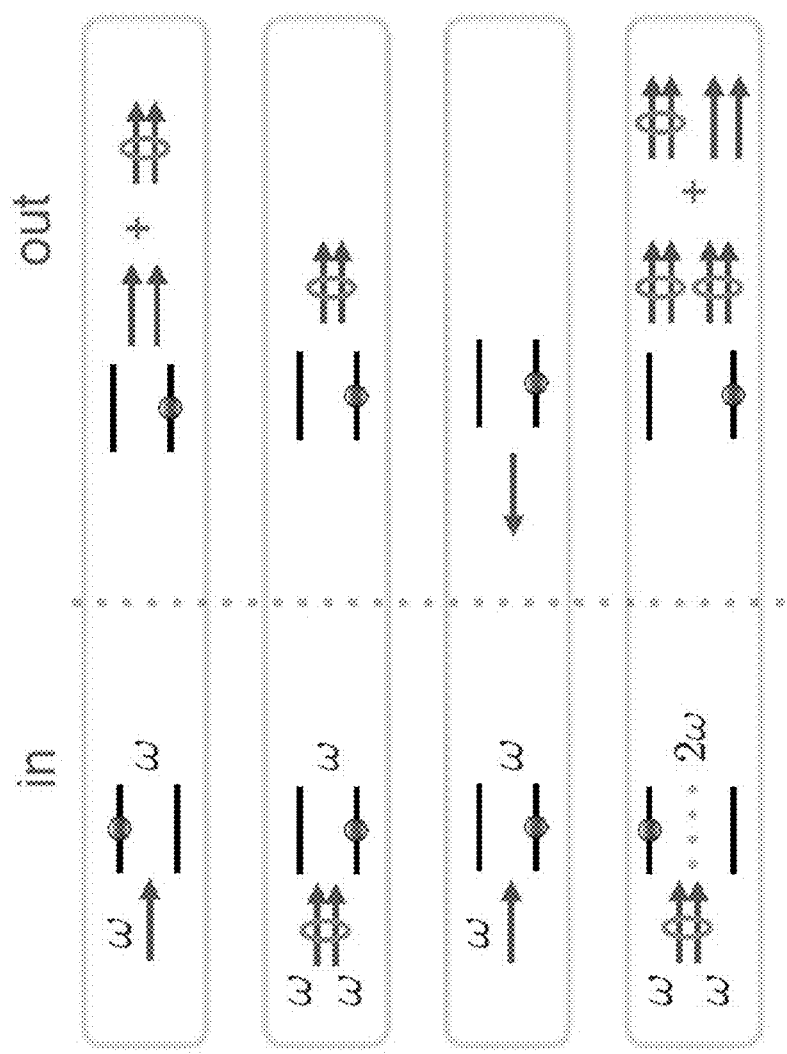

PHOTONIC MOLECULE LASER

CROSS-REFERENCE TO RELATED APPLICATIONS

This application claims priority to U.S. Provisional Patent Application No. 62/572,092, filed Oct. 13, 2017 and entitled "PHOTONIC MOLECULE LASER," the entire contents and disclosures of which are hereby incorporated herein by reference in their entirety.

BACKGROUND

The field of the disclosure relates generally to the production of photonic molecules, defined herein as two or more photons characterized by a quantum mechanical bound state. In particular, the field of the disclosure relates generally to a coherent source of photonic molecules and associated methods for the production and use of photonic molecules.

There has been growing interest in the production and use of photonic molecules that consist of traveling wave packets that each contains two or more photons correlated in photonic Fock states and characterized by a temporal or spectral profile. This interest stems partly from the advent of the experimental capability of controlled generation of multi-photon Fock states in a solid-state system. When the photonic wave function of the Fock state is not a product state of the wave functions of the constituent individual photons, the photons are described as being in an entangled photonic Fock states, or alternatively, as photonic molecules.

Photonic molecules are potentially useful in a variety of applications. For example, N-photon photonic molecules, of which the relative wave function decays exponentially when the relative distance between any pair of photons increases (see, for example, FIG. 2A), may further exhibit photonic bunching (see, for example, FIG. 4) and an effective wavelength that is N times smaller than that of individual photons, corresponding to an effective frequency that is an N-fold multiple of the frequency of an individual photon. Such photonic molecules could achieve deep subwavelength optical lithography and super-resolution in optical imaging.

SUMMARY

In one aspect, a photonic molecule seeding source for producing a plurality of photonic molecules is disclosed. The photonic molecule seeding source includes a waveguide with a first face and a second face. The waveguide also includes at least one first dopant, and each first dopant includes an energy level transition corresponding to a first frequency. The at least one first dopant is maintained at a population inverted state. The photonic molecule seeding source further includes a pump source operatively coupled to the first face of the waveguide. The pump source is configured to deliver a laser pulse at the first frequency with a pulse coherence time T into the first face. The pulse coherence time T is less than a correlation time τ of each photonic molecule. The photonic molecule seeding source further includes a filter operatively coupled to the second face of the waveguide, the filter configured to block passage of a photon comprising the first frequency and to transmit a photonic molecule comprising an n-fold multiple of the first frequency, wherein n is the number of photons in the photonic molecule.

In another aspect, a photonic molecule laser is provided. The photonic molecule laser includes a photonic molecule waveguide with a first face and a second face, as well as at least one second dopant. Each second dopant includes an energy level transition corresponding to a second frequency that is an n-fold multiple of a first frequency. The at least one second dopant is maintained at a population inverted state. The photonic molecule laser also includes a photonic molecule seeding source operatively coupled to the first face of the photonic molecule waveguide. The photonic molecule seeding source is configured to deliver a plurality of photonic molecules. Each photonic molecule includes a threshold bound state of n photon. Each of the n photons has a first frequency, and each photonic molecule has a photonic molecule frequency equal to the second frequency. The photonic molecule laser further includes a second filter operatively coupled to the photonic molecule waveguide. The second filter is configured to block passage of the photon and to transmit the photonic molecule. The at least one second dopant of the photonic molecule waveguide amplifies the number of photonic molecules via stimulated emission.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures described herein below illustrate various aspects of the disclosure.

FIG. 15 is a schematic illustration showing an example of the effect of changing transmission media on the propagation speed of photons within the transmission media;

FIG. 17D is a schematic illustration showing a waveguide according to a third aspect;

FIG. 17E is a map of an intensity profile from a simulation of the optical waveguide of FIG. 17D guiding coherent 1563-nm light transmission;

FIG. 30 is a schematic illustration of a method of producing a photonic molecule using an interaction of individual photons mediated by an artificial atom;

FIG. 31 is a schematic illustration of the stimulated emission of a photonic molecule by a 1ω dopant in a laser gain medium in a population inverted state;

FIG. 32 is a schematic illustration of the stimulated emission of a photonic molecule by a 1ω dopant in a laser gain medium in a ground state;

FIG. 33 is a schematic illustration of the scattering of a 1ω photon by a 1ω dopant in a 1ω laser gain medium in a ground state;

FIG. 34 is a schematic illustration of the amplification by stimulated emission of photonic molecules by a 2ω dopant in a laser gain medium in a population inverted state;

DETAILED DESCRIPTION

Figure 1A:
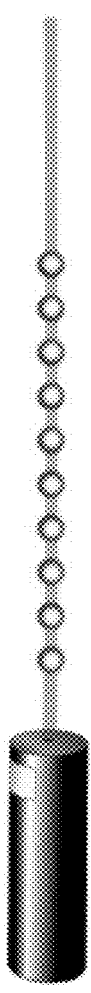
FIG. 1A is a schematic illustration of an existing laser device.
Figure 1B:
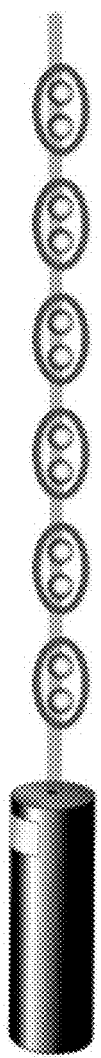
FIG. 1B is a schematic illustration of an mLaser device according to one aspect.
Figure 2A:
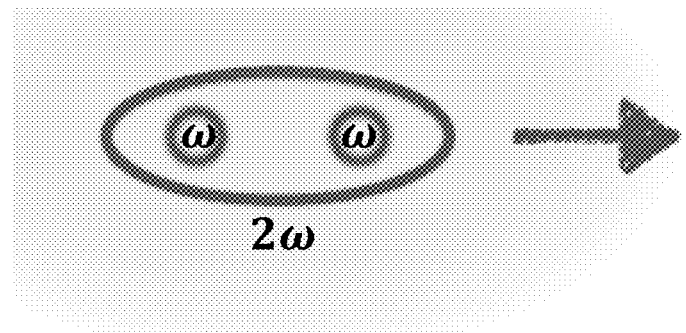
FIG. 2A is a schematic illustration of a two-photon photonic molecule.
Figure 3:
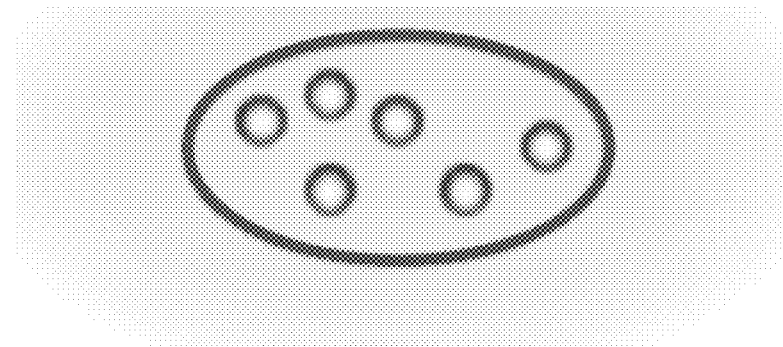
FIG. 3 is a schematic illustration of a multi-photon photonic molecule.

In various aspects, systems, devices, and methods for the production of photonic molecules are disclosed. The term "photonic molecules", as defined herein, refer to two or more photons in a bound quantum state, as illustrated schematically in FIG. 2A for a dual-photon photonic molecule and for a multi-photon photonic molecule in FIG. 3. The individual photons that make up each photonic molecule propagate as a single composite photon with properties that differ from the corresponding properties of the individual photons within the photonic molecule. In one aspect, the frequency of a propagating photonic molecule made up of N photons is essentially equal to the N-fold multiple of the frequency $\omega$ of the individual photons, i.e. the photonic molecule frequency is N$\omega$. In addition, if the individual photons in the photonic molecule have a wavelength $\lambda$, the composite wavelength of the photonic molecule is $\lambda$/N By way of non-limiting example, a photonic molecule with two bound photons in which each photon has a frequency $\omega$ and wavelength $\lambda$, will propagate as a single composite photon with frequency 2$\omega$ and wavelength $\lambda$/2, as illustrated in FIG. 2A.

Dual-photon photonic molecules of any wavelength or frequency throughout the electromagnetic (EM) spectrum without limitation may be produced using the systems, devices, and methods as disclosed herein. In various aspects, the particular wavelength or frequency of the dual-photon photonic molecules may be influenced by any one or more of at least several factors described in additional detail below including, but not limited to, choice of gain media, excitation schemes, and feedback mechanisms selected for use in the disclosed systems and devices, as well as the intended use of the dual-photon molecules. In various aspects, the wavelengths/frequencies of the dual photon photonic molecules may fall within a class of EM radiation including, but not limited to, gamma radiation at wavelengths of less than about 0.1 Å, X-ray radiation at wavelengths ranging from about 1 Å to about 10 nm, ultraviolet radiation at wavelengths ranging from about 1 nm to about 400 nm, visible radiation at wavelengths ranging from about 400 nm to about 700 nm, near-infrared radiation at wavelengths ranging from about 700 nm to about 1000 nm, infrared radiation at wavelengths ranging from about 700 nm to about 1 mm, terahertz radiation at wavelengths ranging from about 100 μm to about 1 mm, microwave radiation at wavelengths ranging from about 1 mm to about 1 m, and radio waves at wavelengths ranging from about 1 m to about 100 km. By way of non-limiting example, dual-photon photonic molecules with near-infrared (near-IR) wavelengths ranging from about 0.75 μm to about 1.4 μm may be produced for use in biomedical applications, due to facilitate penetration into biological tissues, as is well-known in the art. By way of another non-limiting aspect, dual-photon photonic molecules with shorter wavelength, such as X-ray or ultraviolet wavelengths, may be selected to enhance the resolution in ex vivo applications, such as imaging.

Figure 2B:
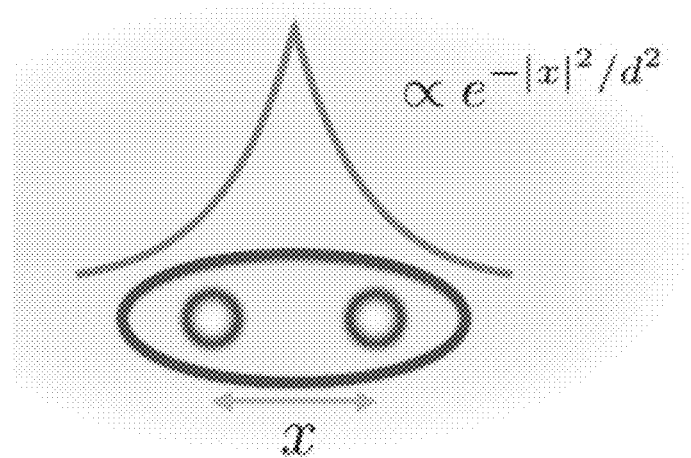
FIG. 2B is a schematic illustration of the two-photon photonic molecule of FIG. 2A showing a second-order correlation function of the photonic molecule as a function of separation distance of the photons within the photonic molecule.
Figure 4:
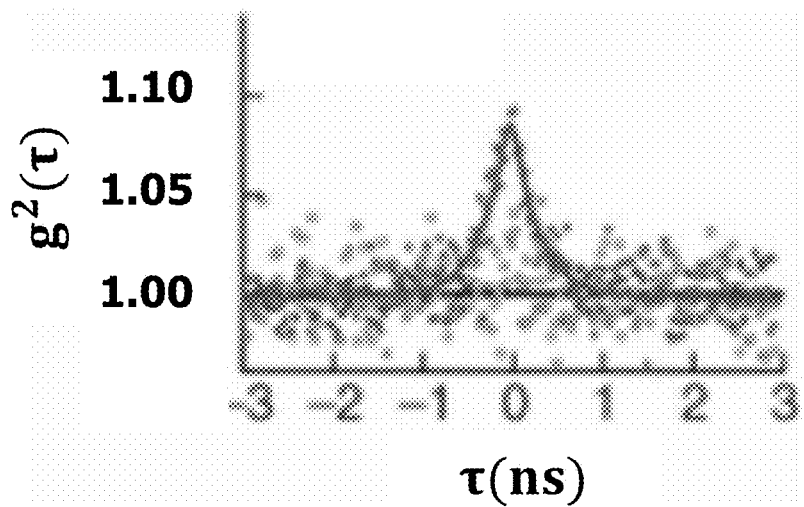
FIG. 4 is a graph of the second-order correlation function of a multi-photon photonic molecule shown with respect to a relative detection time.
Figure 40:
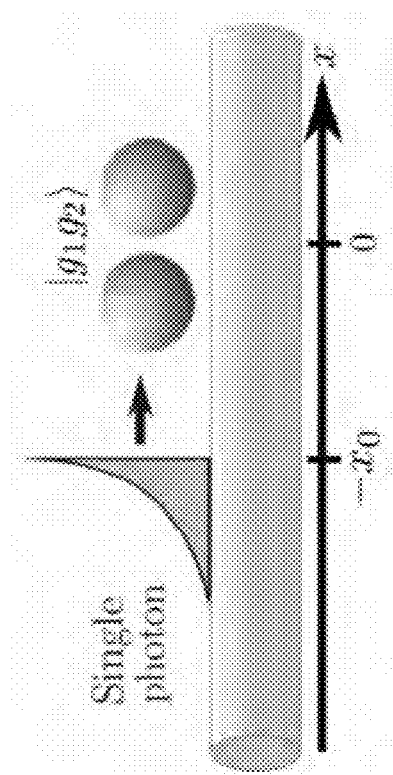
FIG. 40 is a schematic illustration showing the spatial extent of illumination using photonic molecules.
Figure 41:
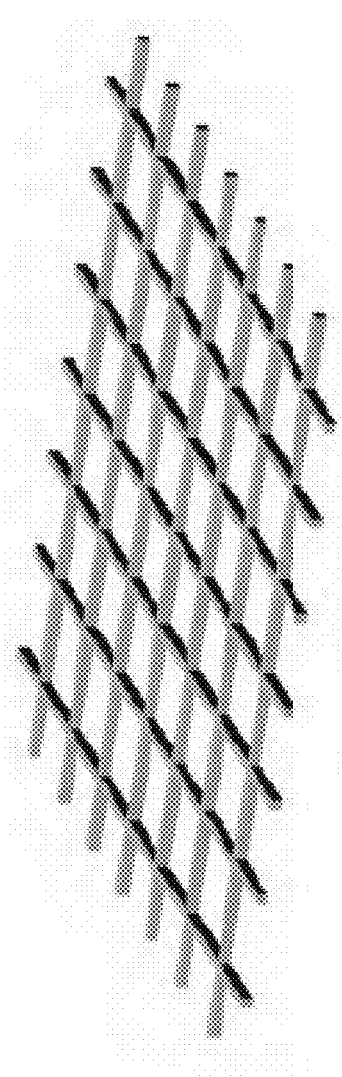
FIG. 41 is an illustration of a square lattice waveguide.
Figure 42:
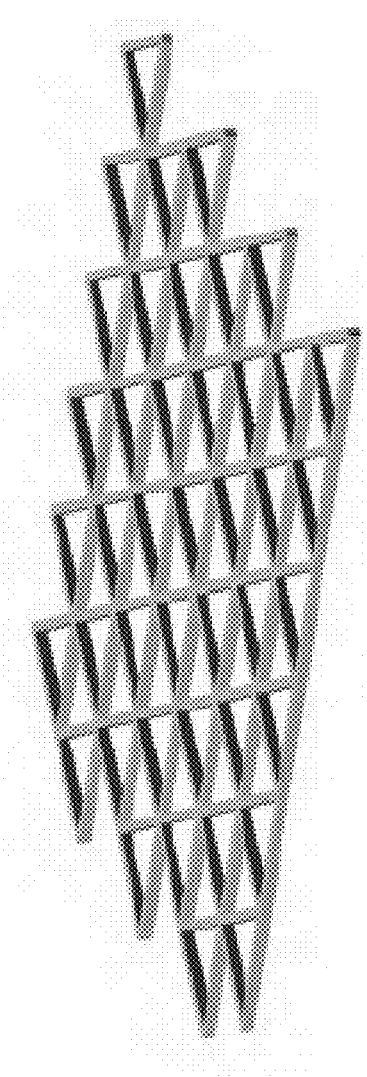
FIG. 42 is an illustration of a triangular lattice waveguide.
Figure 43:
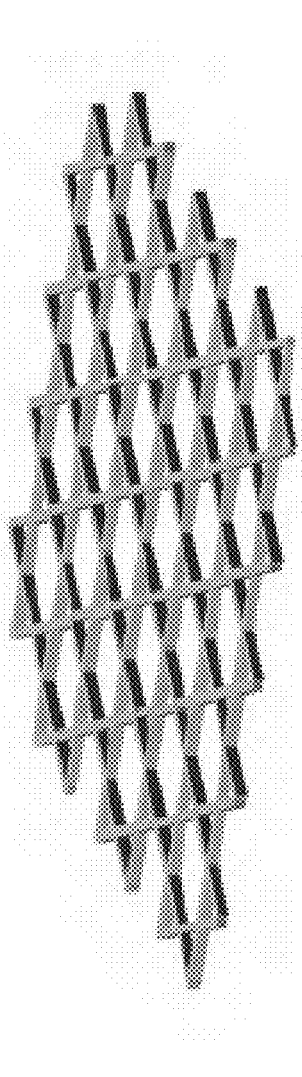
FIG. 43 is an illustration of a kagome lattice waveguide.
Figure 44:
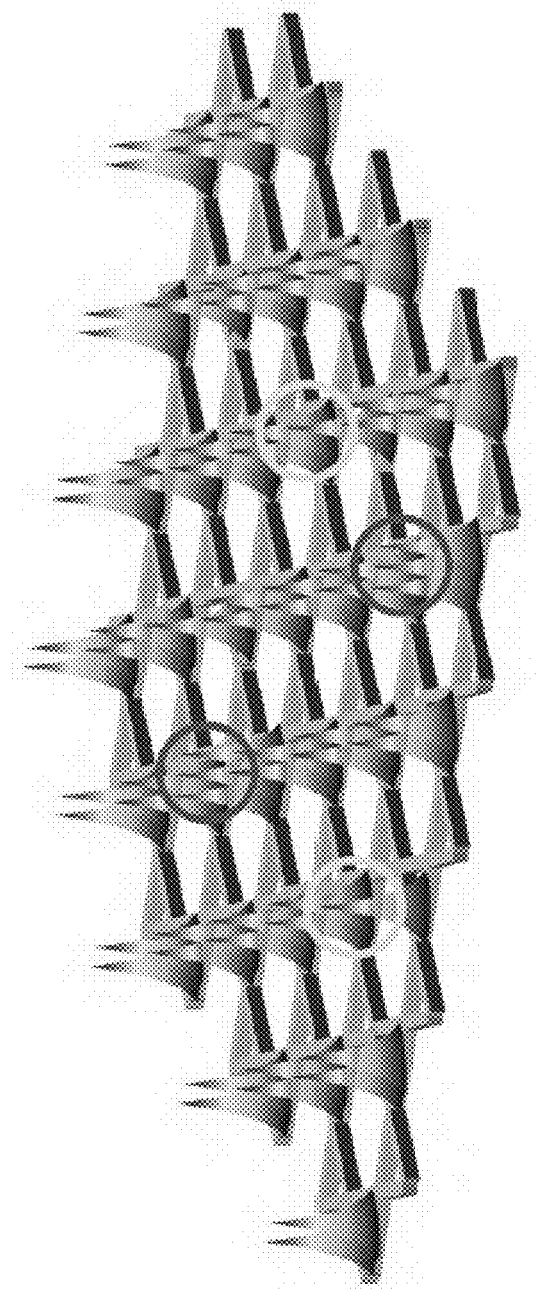
FIG. 44 is a schematic illustration of photonic molecule formation on a kagome lattice quantum slow-light waveguide.

Without being limited to any particular theory, the two or more photons of the photonic molecule, each having a wave function as illustrated in FIG. 40, are bound together as a result of a composite quantum state, as illustrated in FIG. 2B. This composite quantum state is characterized by a relative wave function with a maximum value at some minimum photon-to-photon separation distance. In addition, the relative wave function decays exponentially as the photon-to-photon separation distance increases from the minimum separation distance. This form of relative wave function favors close association of the two or more photons of the photonic molecule over propagation as individual photons. By way of non-limiting example, the close association of the photons within the photonic molecule as governed by the relative wave function as described above is manifested as bunching behavior of the photons within the photonic molecules, as expressed by the second-order correlation function of the photons of a photonic molecule, shown graphed as a function of relative photon detection time in FIG. 4.

Figure 14:
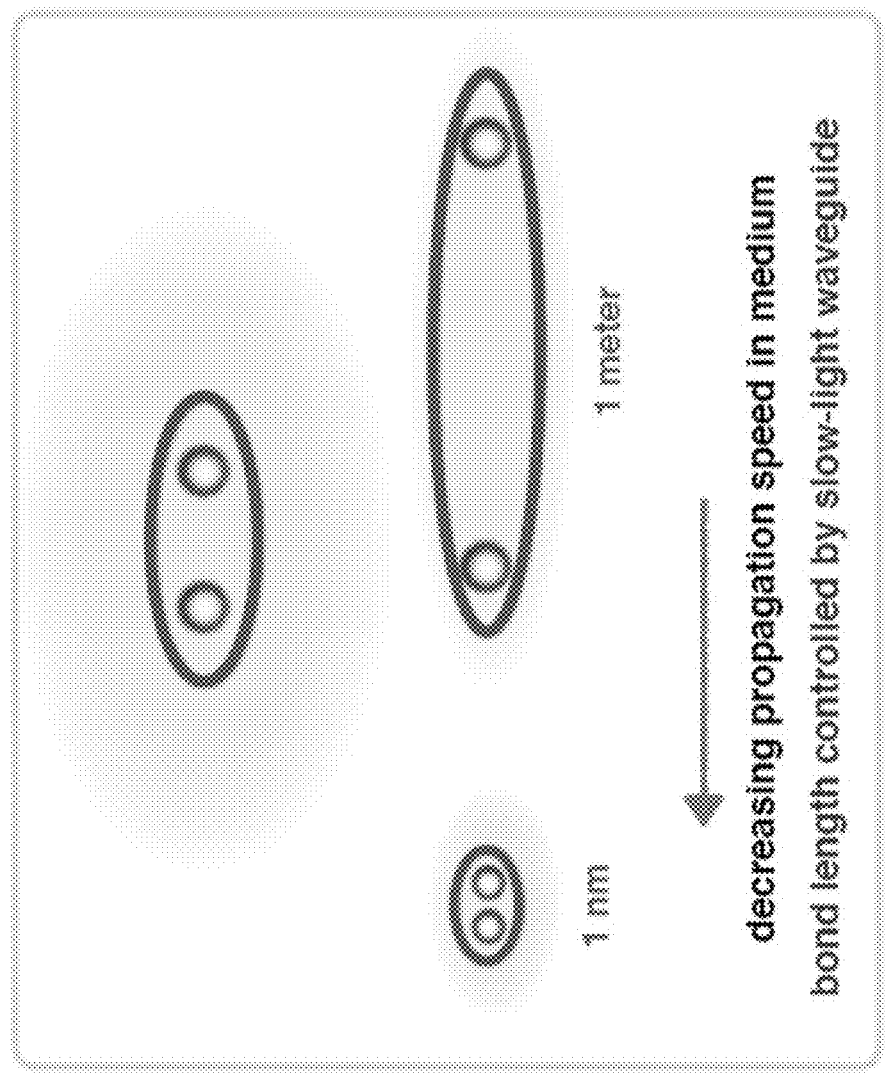
FIG. 14 is a schematic illustration showing the impact of propagation speed on the size of a two-photon photonic molecule.
Figure 16:
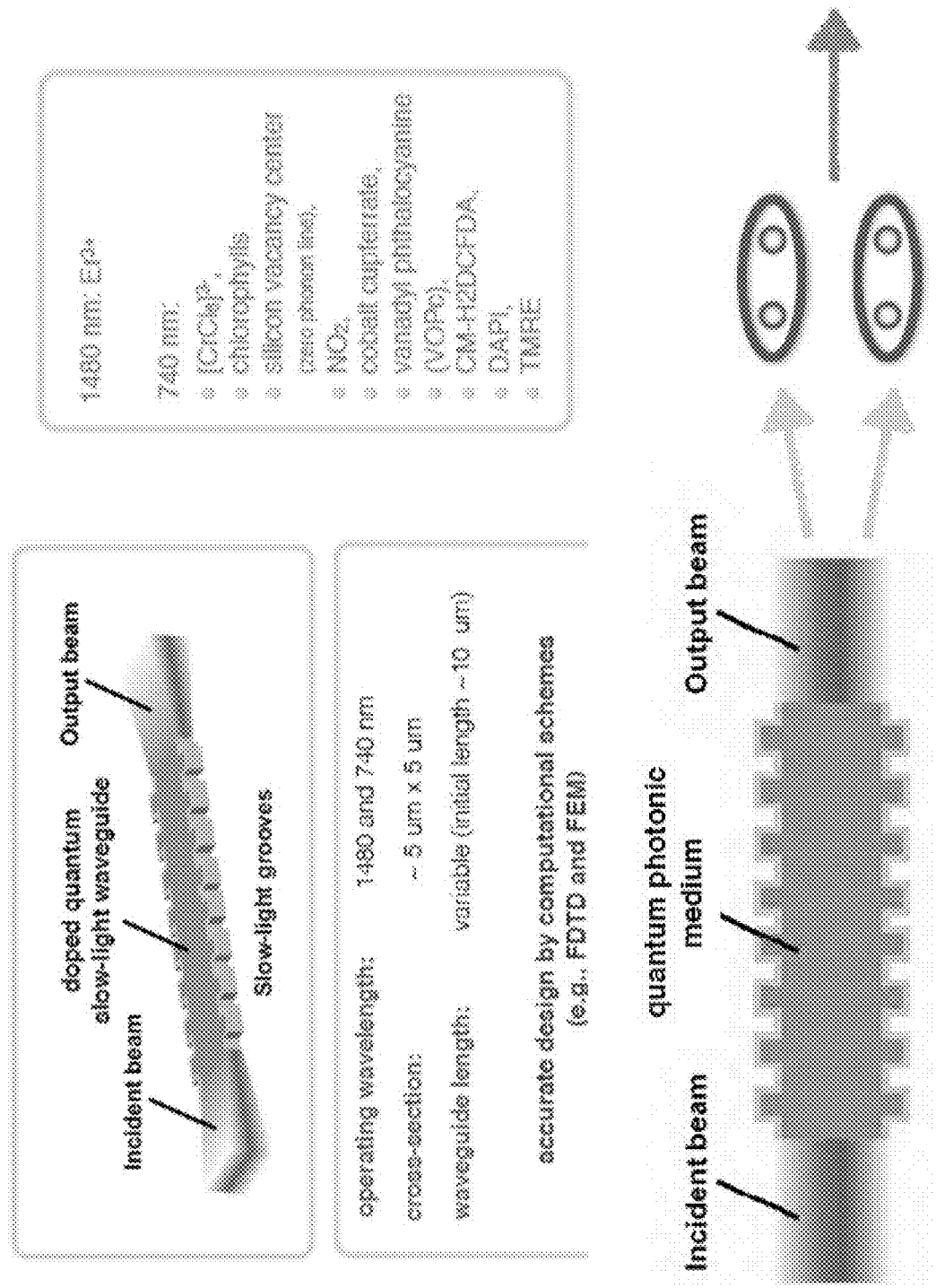
FIG. 16 is a schematic illustration of a slow-light waveguide according to one aspect.
Figure 17B:
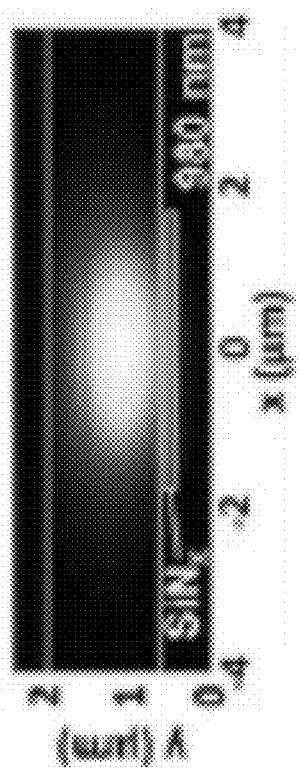
FIG. 17B is a map of a simulation of the optical waveguide of FIG. 17A guiding coherent 980-nm light transmission.
Figure 17C:
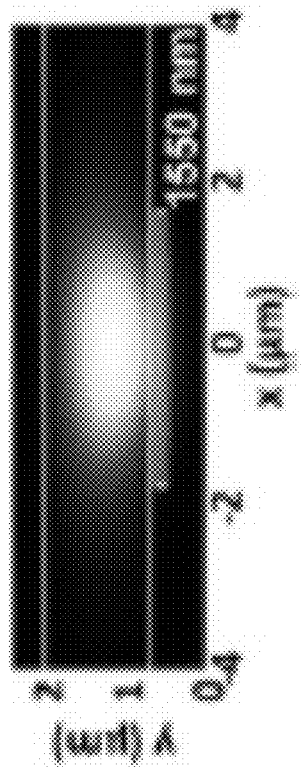
FIG. 17C is a map of a simulation of the optical waveguide of FIG. 17A guiding coherent 1550-nm light transmission.
Figure 17A:
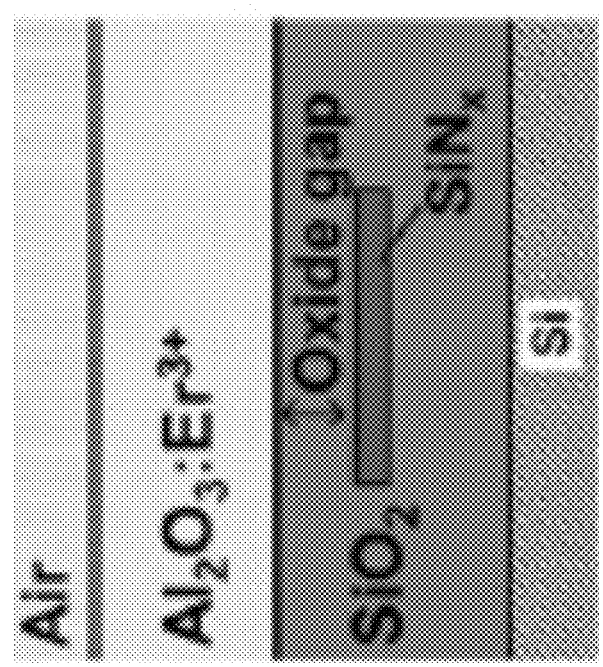
FIG. 17A is a schematic illustration showing an optical waveguide according to a second aspect.
Figure 17G:
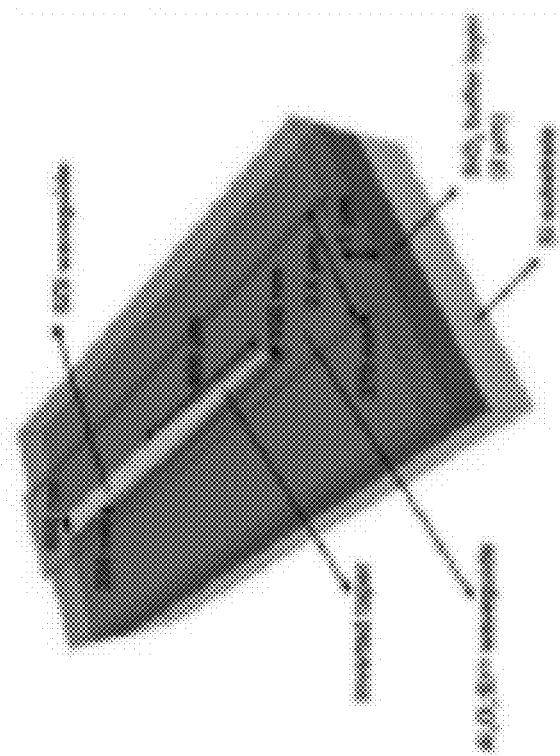
FIG. 17G is a map of light transmission speed throughout a cross-section of the slow-light waveguide illustrated in FIG. 17F.
Figure 17F:
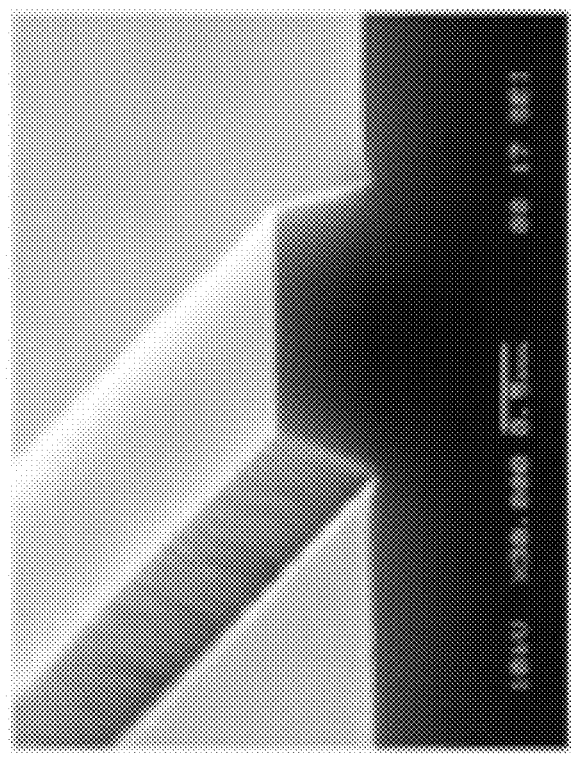
FIG. 17F is a microscopic image of a slow-light waveguide according to a fourth aspect.
Figure 18:
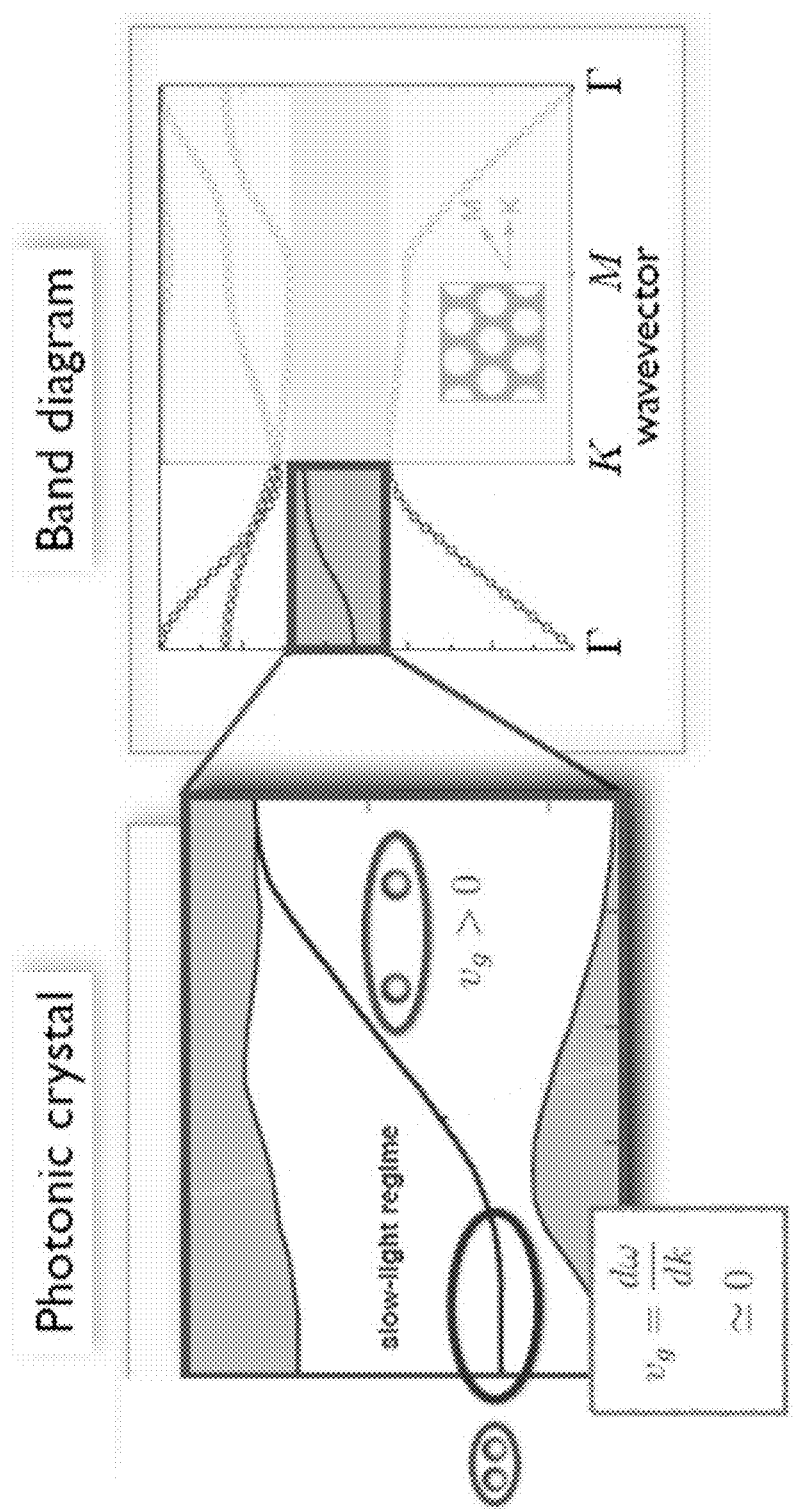
FIG. 18 is a representative band diagram illustrating a slow light regime within the band diagram of a photonic crystal material of a slow-light waveguide according to one aspect.
Figure 19A:
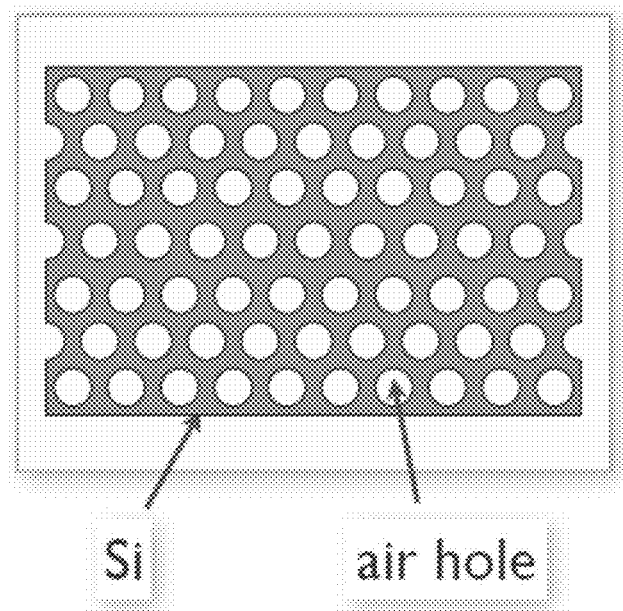
FIG. 19A is a schematic of a photonic crystal waveguide according to one aspect.
Figure 19B:
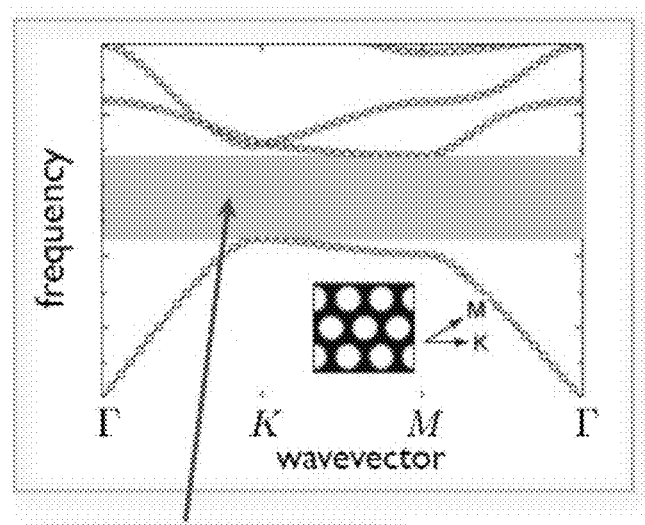
FIG. 19B is a representative band diagram corresponding to the photonic material of the waveguide illustrated in FIG. 19A.
Figure 20A:
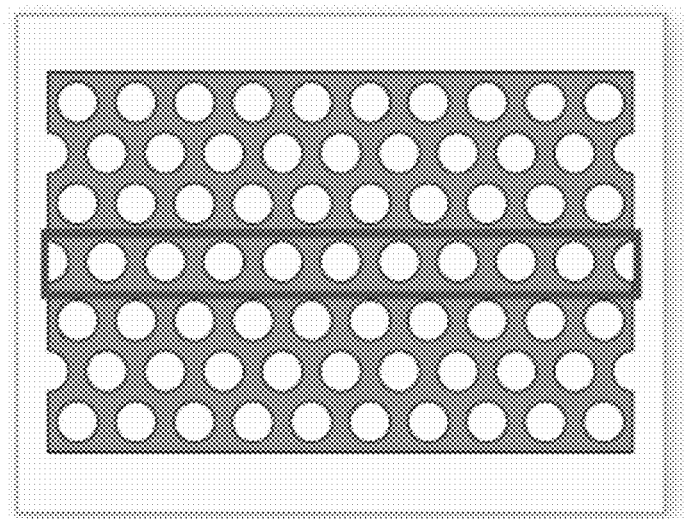
FIG. 20A is the schematic diagram of the photonic crystal waveguide of FIG. 19A with a red rectangle superimposed to delineate an interior region of the waveguide.
Figure 20B:
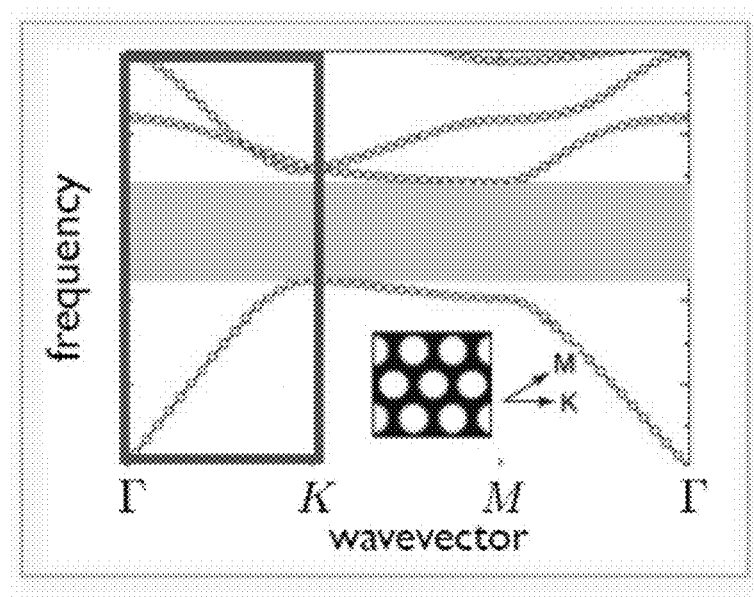
FIG. 20B is the band diagram of FIG. 19B with a red rectangle superimposed to delineate the properties of the region within the red rectangle superimposed on the waveguide illustrated in FIG. 20A.
Figure 21A:
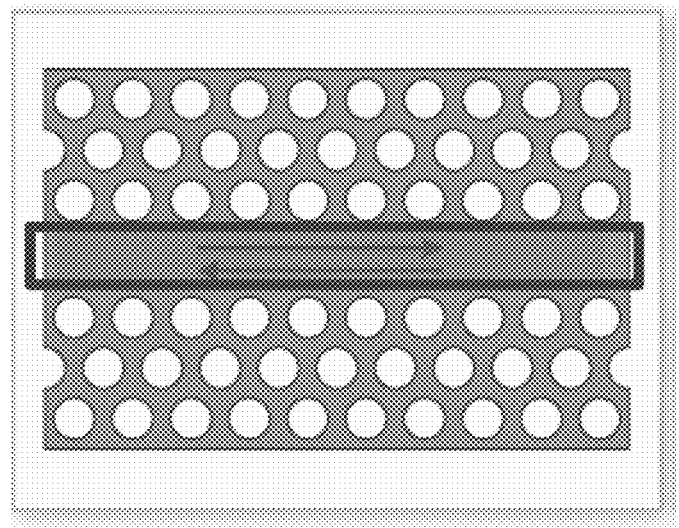
FIG. 21A is a schematic diagram of a photonic crystal waveguide in another aspect with a red rectangle superimposed to delineate the line-defect region.
Figure 21B:
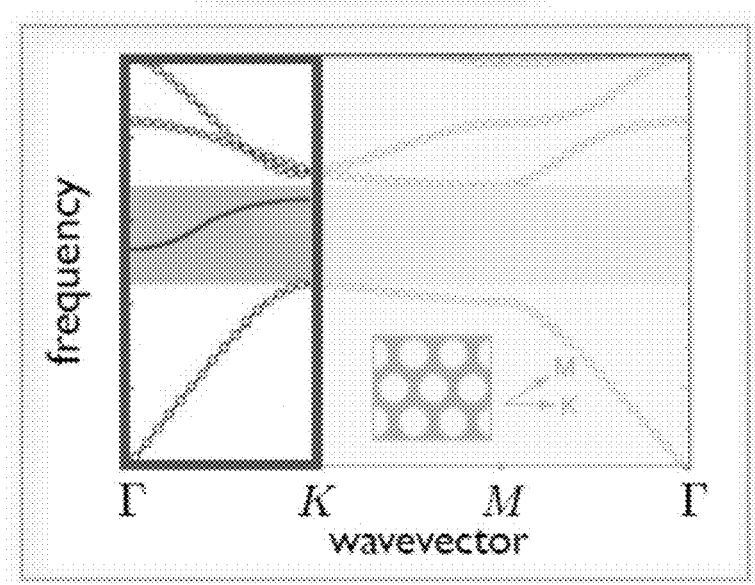
FIG. 21B is a band diagram of corresponding to the photonic crystal waveguide illustrated in FIG. 21A with a red rectangle superimposed to delineate the properties of the line-defect region within the waveguide illustrated in FIG. 21A.
Figure 22:
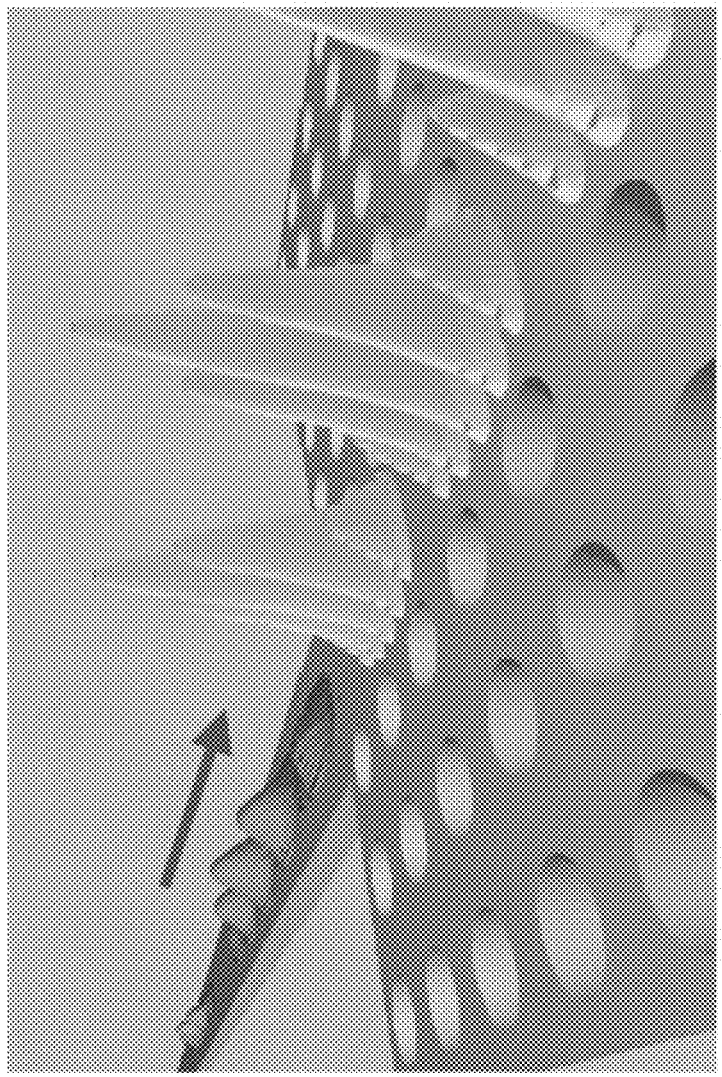
FIG. 22 is a schematic diagram of a slow-light waveguide illustrating the bunching and amplitude increase resulting from propagation through the waveguide in one aspect.
Figure 24:
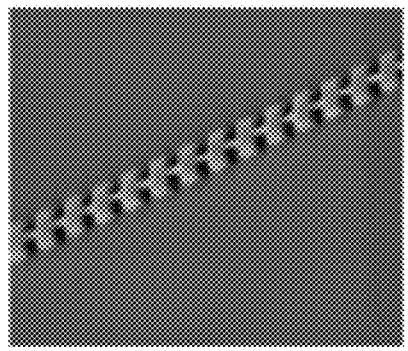
FIG. 24 is a microscopic image of a slow-light waveguide in another aspect.
Figure 25:
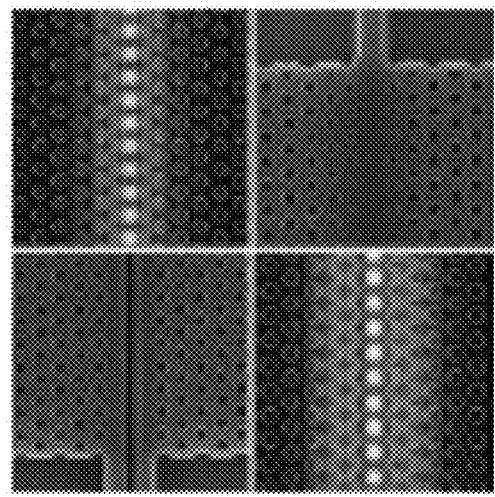
FIG. 25 includes four microscopic images of a slow-light waveguide in an additional aspect.
Figure 23:
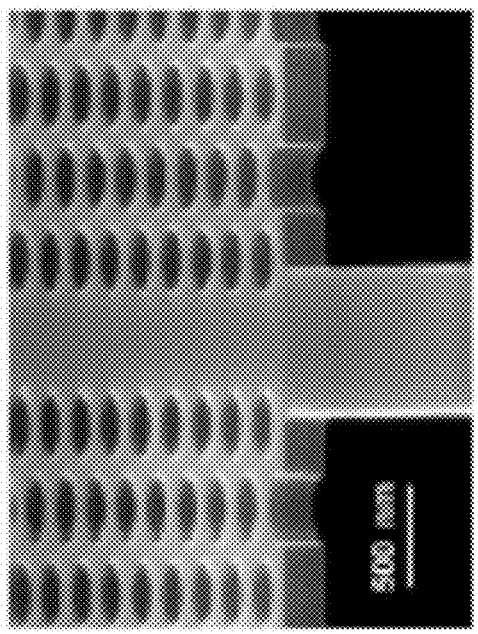
FIG. 23 is a microscopic image of a slow-light waveguide in an aspect.
Figure 26A:
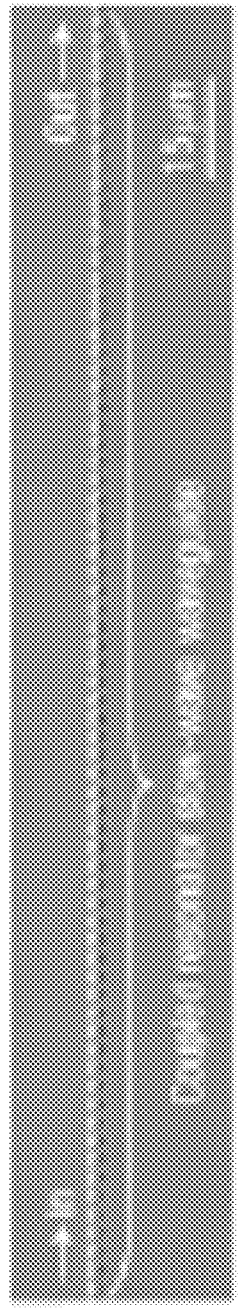
FIG. 26A is a microscopic image of a slow-light waveguide in another additional aspect.
Figure 26C:
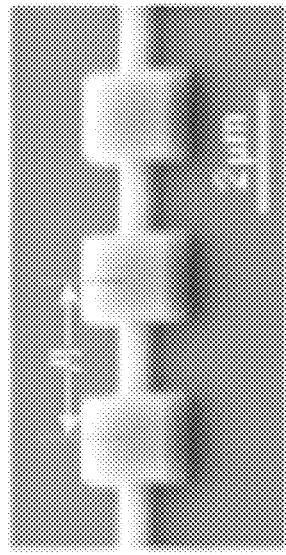
FIG. 26C is a microscopic image showing details of a central region of the slow-light waveguide of FIG. 26A.
Figure 26B:
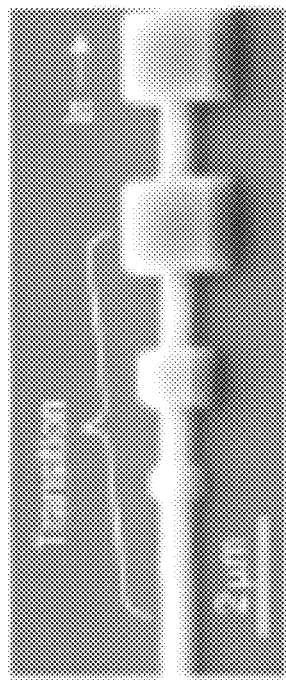
FIG. 26B is a microscopic image showing details of a transition region of the slow-light waveguide of FIG. 26A.
Figure 27B:
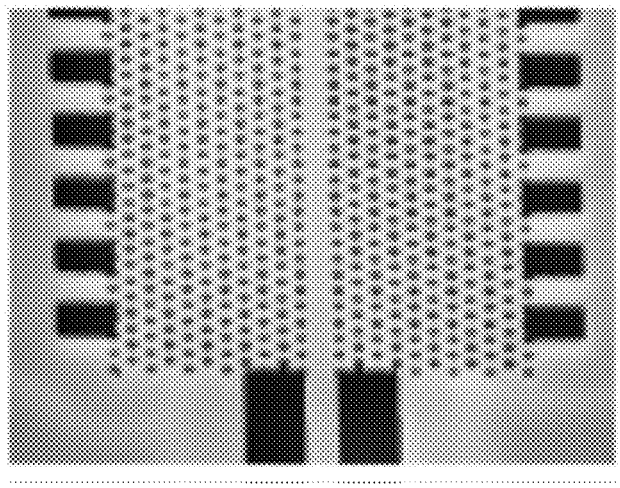
FIG. 27B is a microscopic image showing an opposite surface of the slow-light waveguide of FIG. 27A.
Figure 27A:
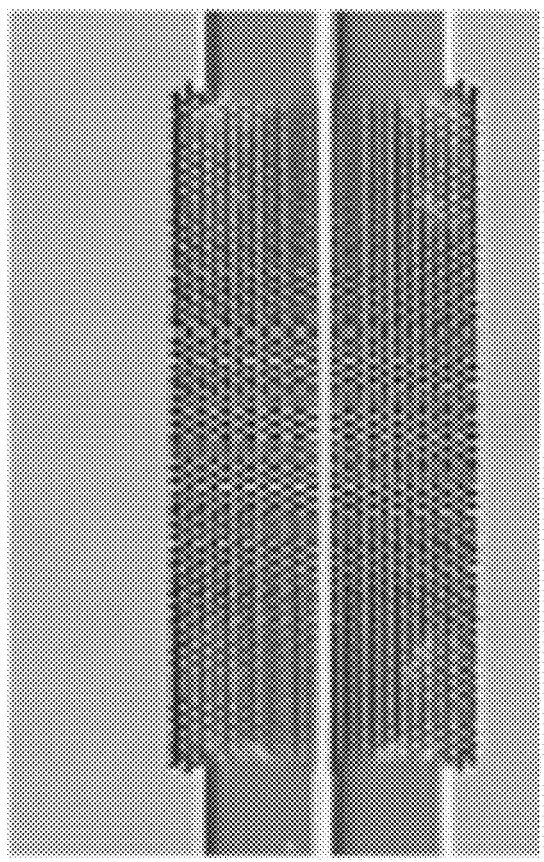
FIG. 27A is a microscopic image of a slow-light waveguide in an aspect.
Figure 28B:
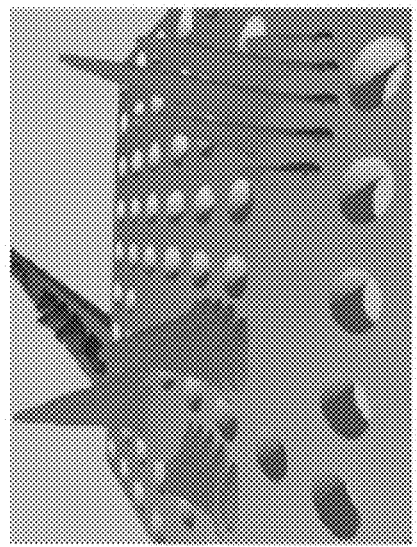
FIG. 28B is a schematic illustration showing the propagation of light through a waveguide with a non-linear light path.
Figure 28D:
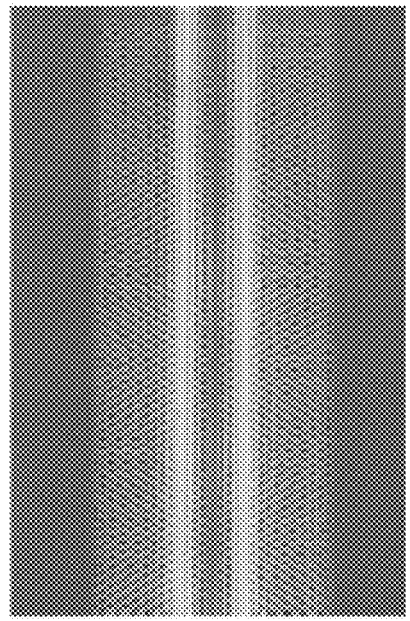
FIG. 28D is a microscopic image of a waveguide with multiple light paths.
Figure 28A:
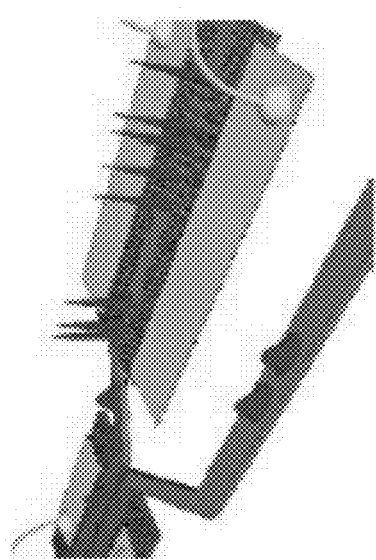
FIG. 28A is a schematic illustration showing the propagation of light through a waveguide with multiple light paths characterized by different light propagation speeds.
Figure 28C:
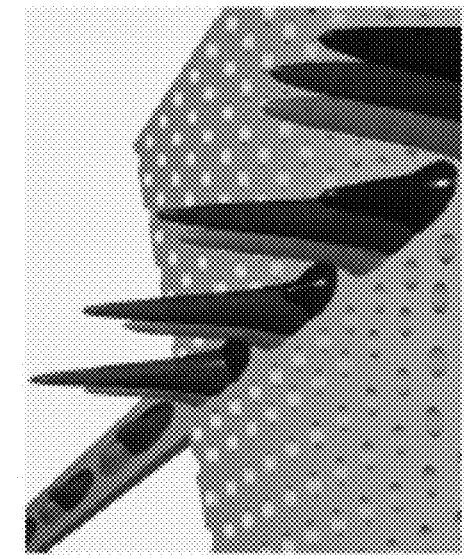
FIG. 28C is a schematic illustration showing the propagation of light through a waveguide with a single linear light path.

In addition the 'bond length" between individual photons within a photonic molecule, defined herein as the photon-to-photon separation distance at which the photonic molecule's relative wave function is near the maximum value, varies as a function of the propagation speed, as illustrated schematically in FIG. 14. In an aspect, the size (i.e. bond length) of the photonic molecule ranges from nanometers to meters. As illustrated in FIG. 14, the bond length of the photonic molecule decreases as the propagation speed is decreased. Without being limited to any particular theory, the propagation speed of the photonic molecule can be manipulated by varying the medium through which the photonic molecules propagate, as illustrated schematically in FIG. 15. The propagation speed of the photonic molecules is thought to be equivalent to the propagation speed of light in the form of single photons, and may be expressed as the ratio of c, the speed of light in a vacuum, divided by n, the refractive index associated with a material. As illustrated in FIG. 15, the index of refraction may be any value greater than 1 (corresponding to a vacuum), 1.3 for water, 1.5 or higher for various glass compositions, and values of 2.5 or more for other materials such as diamond and moissanite. In various aspects, the propagation speed may be manipulated by propagating the photonic molecules through a quantum photonic material such as a doped quantum slow-light waveguide similar to the line-defect wave guide devices illustrated schematically in FIGS. 16, 17A, 17D, 17G, 21A and FIG. 21B.

In various aspects, the propagation speed of the photonic molecules generated by the systems, devices, and methods described herein may be modulated using an optical waveguide with an engineered dispersion relation that characterizes one or more aspects of the optical waveguide including, but not limited to, light propagation speed, available light bandwidth, and any other relevant performance parameter. Any known engineering method may be used to design an optical waveguide with a suitable dispersion relation including, but not limited to, dispersion engineering or band structure engineering method, as illustrated schematically in FIGS. 18, 19A, 19B, 20A, 20B, 21A, 21B, 22, 23, 24, 25, 26A, 26B, 26C, 27A, 27B, 28A, 28B, 28C, and 28D.

In various aspects, the photonic molecules are produced by the interactions of individual photons with artificial atoms, quantum dots, and/or selected dopants including, but not limited to, a dopant within a solid state gain medium material, as illustrated schematically in FIG. 30. Any known dopant material typically used in existing gain medium materials without limitation may be incorporated into the systems and devices described below to function as artificial atoms mediating the formation of photonic materials from individual photons. In various aspects, the selected dopants may include energy levels matched to the frequency/wavelength of the individual photons and/or photonic molecules to be produced. Non-limiting examples of suitable dopants that are compatible with 1480 nm photons include $Er^{3+}$. Non-limiting examples of suitable dopants that are compatible with 740 nm photons include $[CrCl_6]^{3-}$, chlorophylls, silicon vacancy centers (zero phonon lines), $NO_2$, cobalt cupferrate, vanadyl phthalocyanine, (VOPc), $CM-H_2DCFDA$, DAPI, and TMRE.

Figure 10A:
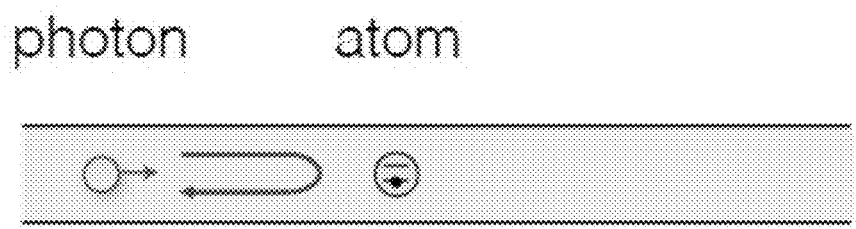
FIG. 10A is a schematic diagram illustrating reflection of a single photon by an atom within an active filter configured to pass only photonic molecules and to scatter single photons.
Figure 10B:
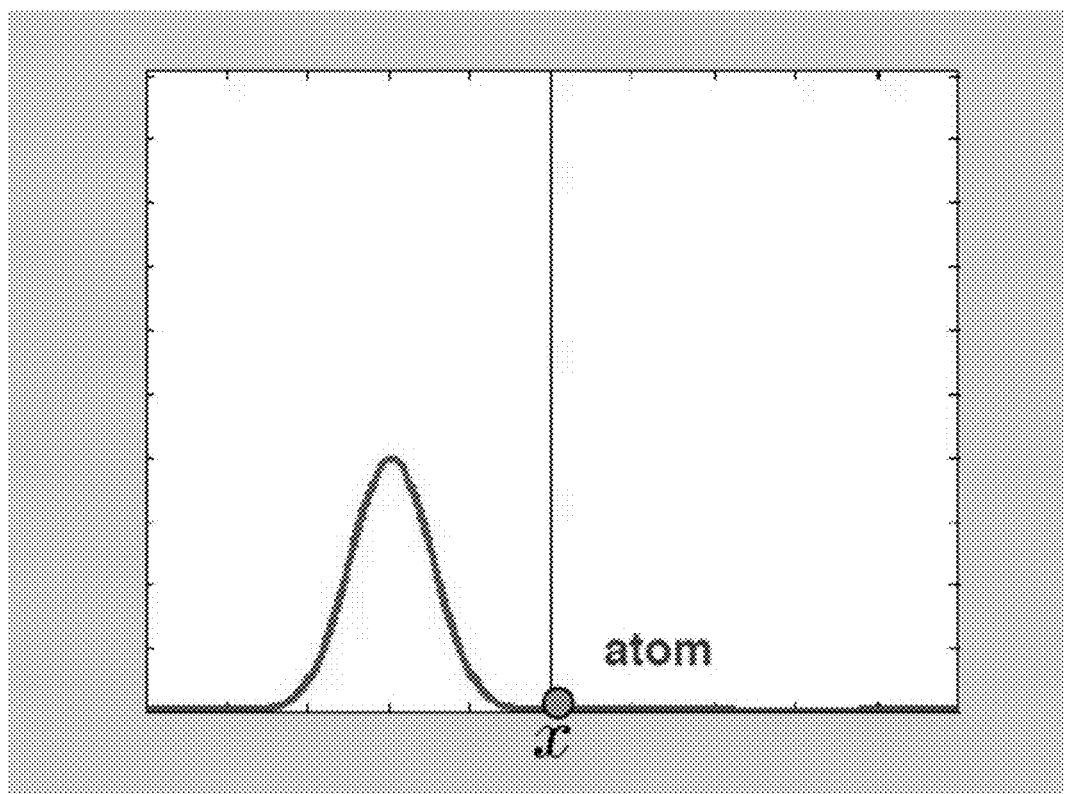
FIG. 10B is a graph of an absorption of an atom within an active filter configured to pass only photonic molecules and to reflect single photons.

In various aspects, a variety of artificial atom-mediated quantum processes are used to produce photonic molecules, to separate photonic molecules from individual photons, and to amplify the number of photonic molecules, illustrated schematically in FIGS. 31, 32, 33, and 34. In various aspects, the photonic molecules are produced by a process of stimulated emission and amplification mediated by the interaction of individual photons and/or photonic molecules with the quantum energy levels of single dopant atoms of a gain medium maintained in a population inversion state under specific pumping conditions described in detail below. In brief, under suitable conditions, photonic molecules are produced by the interaction of two or more photons with a frequency of ω with a single quantum energy level of a dopant atom in a population-inverted energetic state within a gain medium. As illustrated in FIG. 31, the interaction of a photon with frequency ω with a dopant in a population-inverted energetic state that includes an energy level transition corresponding to frequency ω may produce a mixture of single photons with a frequency of ω and dual-photon photonic molecules with a composite frequency of 2ω by a stimulated emission process. As illustrated in FIG. 32, an interaction of a dual photon photonic molecule with a composite frequency of 2ω with a dopant in a depleted energetic state that includes an energy level transition corresponding to frequency ω releases a single dual photon photonic molecule, effectively transmitting the photonic molecule through the dopant under these conditions. As illustrated in FIG. 33, a photon with frequency ω may not interact with a dopant in a depleted energetic state that includes an energy level transition corresponding to frequency ω, effectively reflecting the photon, as illustrated in FIGS. 10A and 10B. As illustrated in FIG. 34, the interaction of a dual-photon photonic molecule with a composite frequency of 2ω may interact with a dopant in a population-inverted energetic state that includes an energy level transition corresponding to frequency 2ω may produce a mixture of single photons with a frequency of ω and dual-photon photonic molecules with a composite frequency of 2ω by a stimulated emission process, effectively amplifying the photonic molecules.

Figure 35:
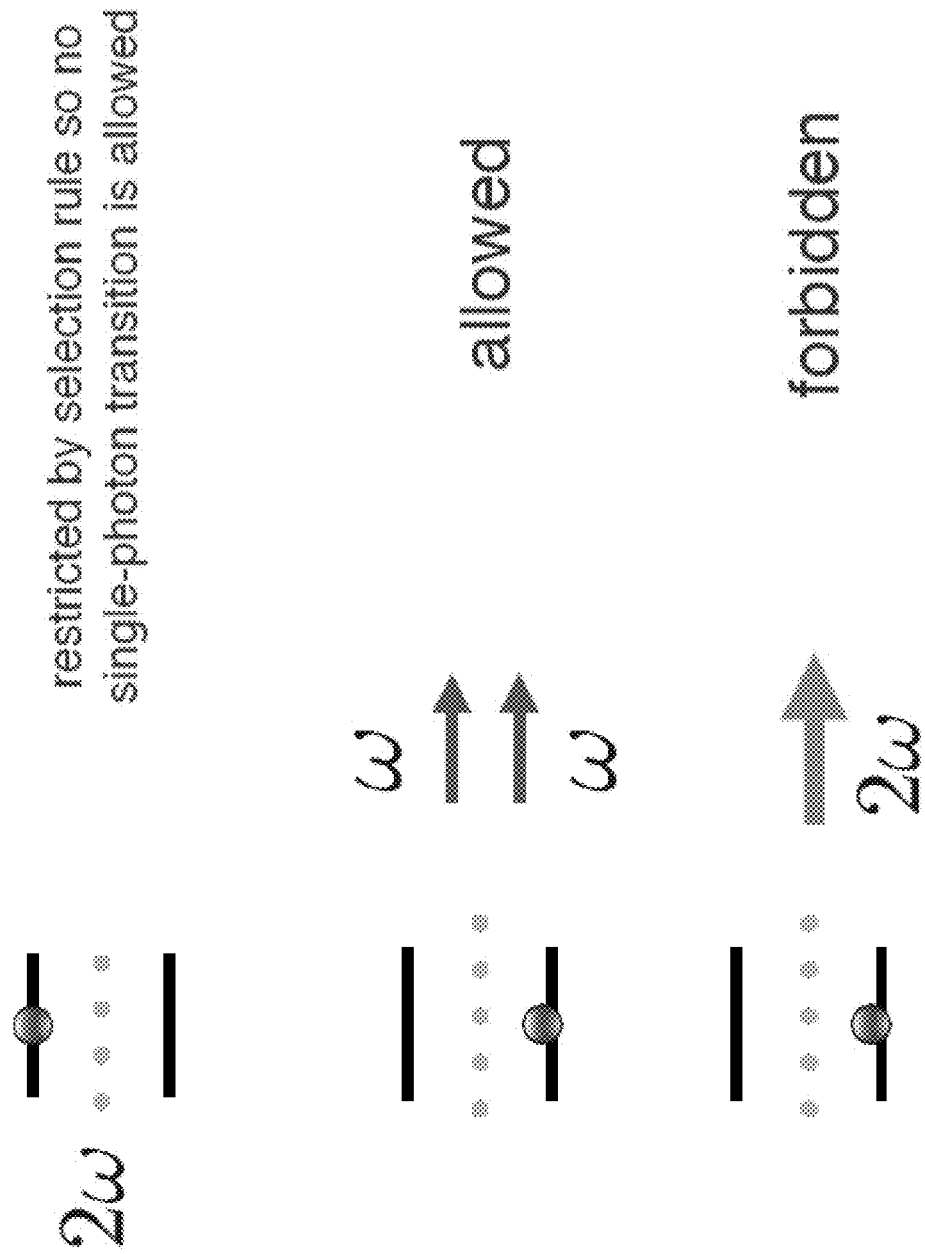
FIG. 35 is a schematic illustration of the emission of 1ω photons, but not 2ω photons, from a 2ω dopant in a population inverted state.
Figure 36:
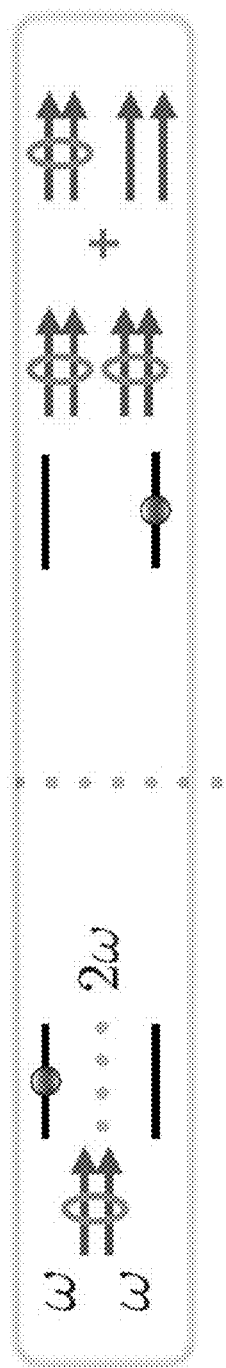
FIG. 36 is a schematic illustration of the stimulated emission of photonic molecules from a 2ω dopant in a population inverted state.
Figure 37:
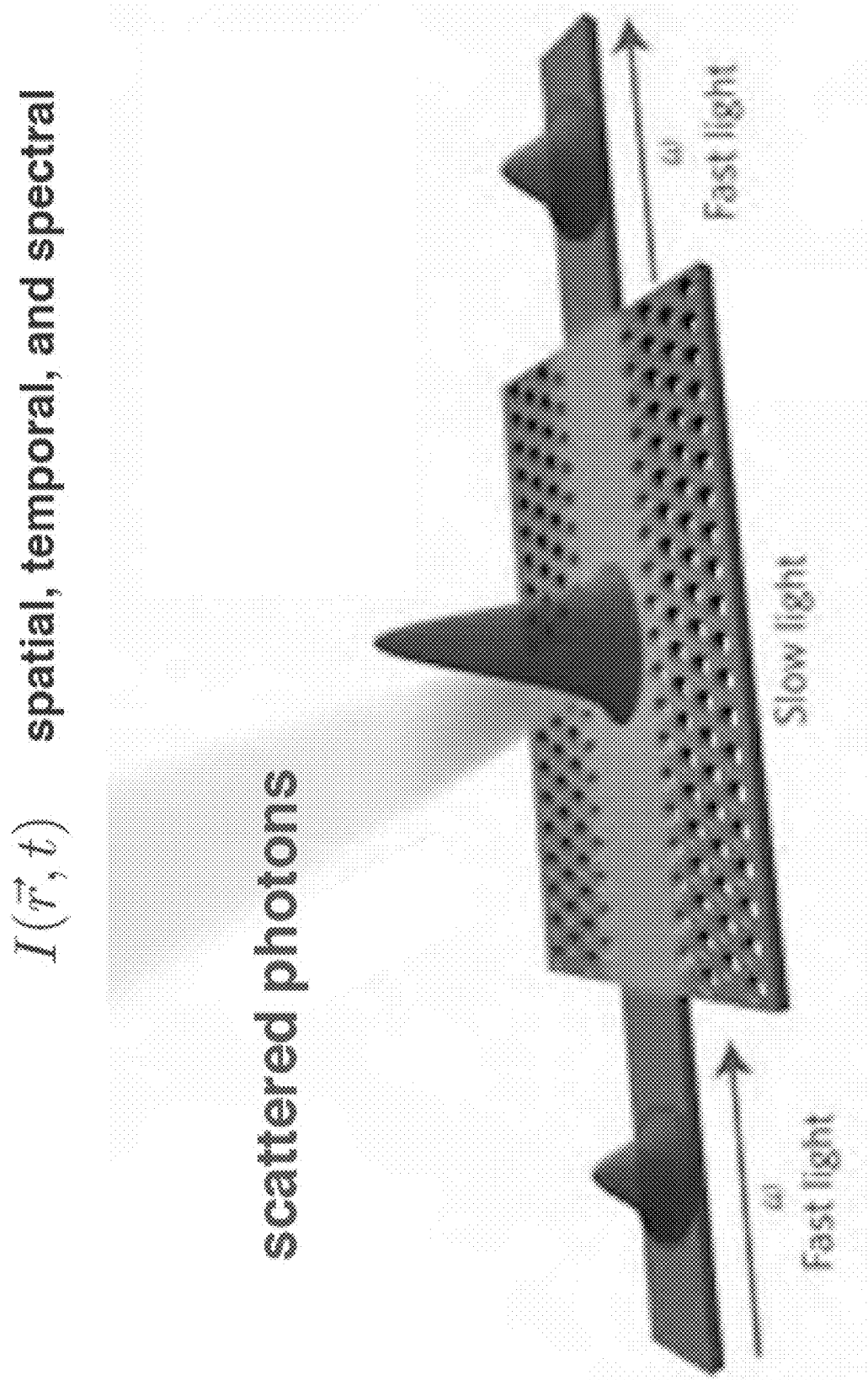
FIG. 37 is a schematic illustration of the propagation of a photon through a slow light waveguide.
Figure 45:
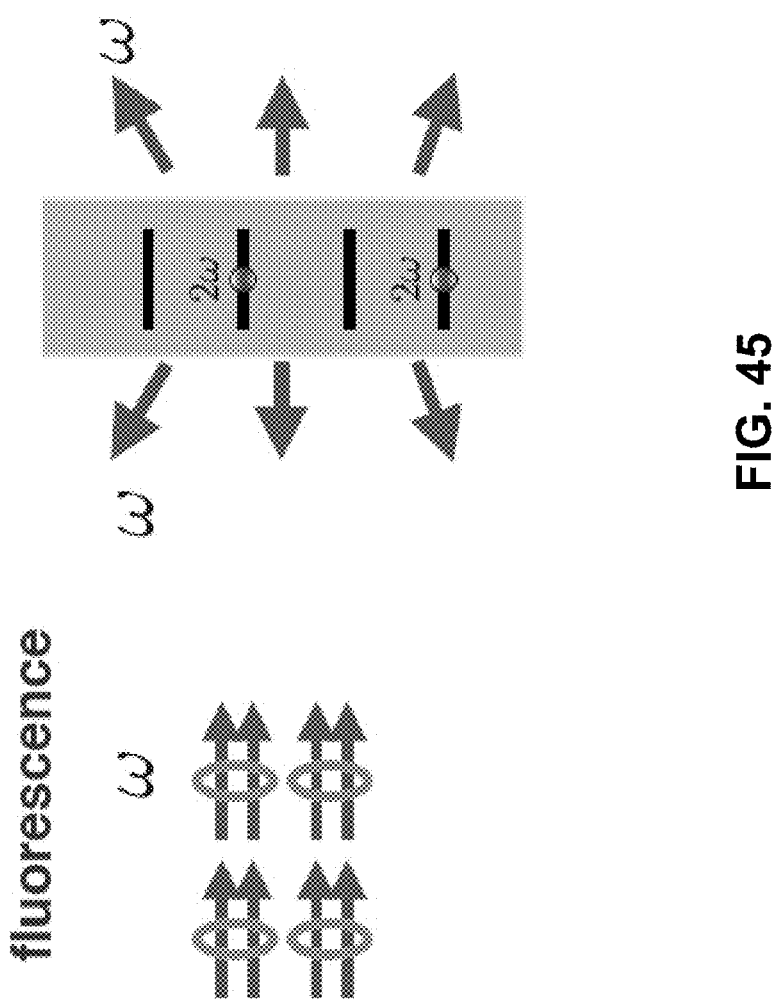
FIG. 45 is a schematic illustration of photonic molecule illumination in fluorescence microscopy eliminating off-resonance fluorescence.

As illustrated in FIG. 35, the interaction of single photons with a dopant in a population-inverted energetic state that includes an energy level transition corresponding to frequency 2ω is restricted by the selection rule, thereby forbidding this interaction. However, an interaction of two unpaired 1ω photons with the dopant in a depleted energetic state in sufficiently rapid succession results in the production of two unpaired 1ω photons. Further, the interaction of a 2ω photonic molecule with the dopant in a depleted energetic state results in the release of a single 2ω photonic molecule, effectively transmitting the 2ω photonic molecule. These properties of the 2ω dopant reduce the production of unwanted 1ω fluorescence due to the frequency mismatch of the single photons and the dopants, as illustrated in FIG. 45.

Figure 8:
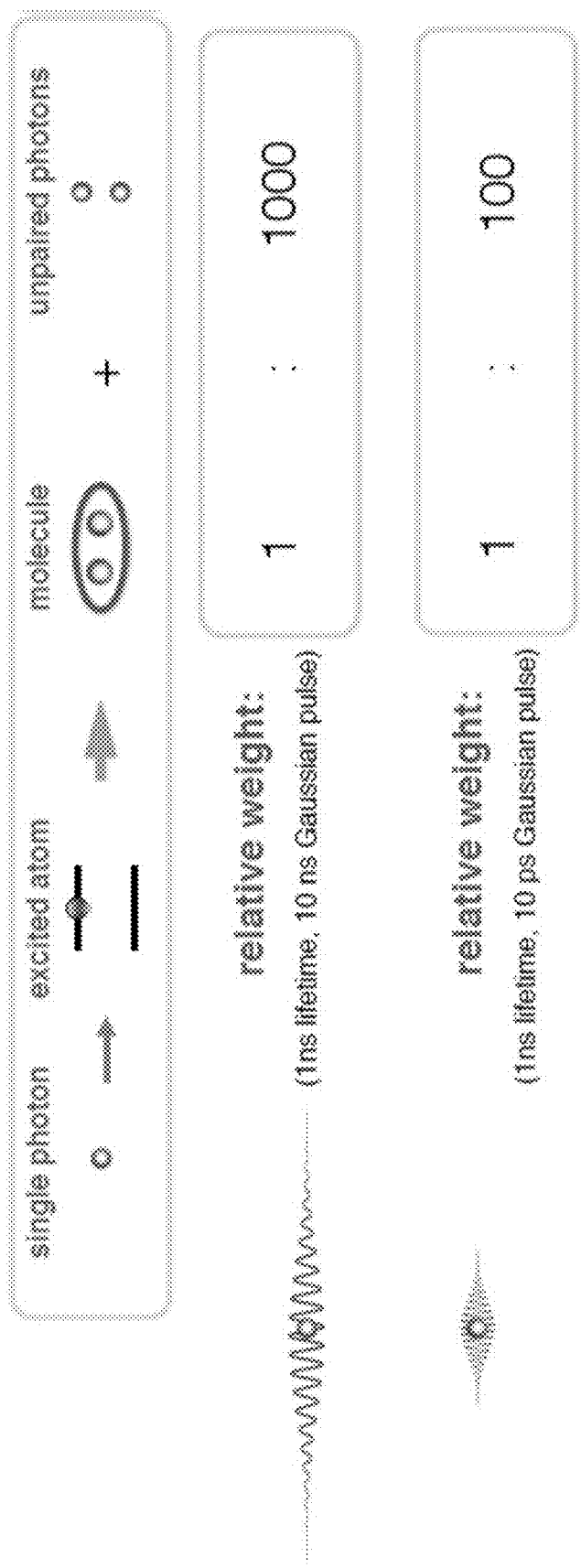
FIG. 8 is a schematic diagram illustrating the influence of pump Gaussian pulse width on the relative proportion of photonic molecules produced by a gain medium.

In various aspects, the pumping conditions of interaction of the single photons and dopants as illustrated in FIG. 31 are modulated to produce a relatively higher proportion of photonic molecules, as illustrated schematically in FIG. 8. In various aspects, a laser pulse with a pulse coherence time $$T = \frac{2\sigma}{v_g}$$

is less than a correlation time $$\tau = \frac{2\pi}{\gamma}$$

of each photonic molecule. In one aspect, a laser pulse with a Gaussian pulse length (σ) of 10 ps or less and a 1 ns lifetime is used to generate photonic molecules and unpaired single photons at a ratio of 1:100 (photonic molecule:single photon pair) or higher. As illustrated in FIG. 8, a laser pulse with a Gaussian pulse length of 10 ns and a 1 ns lifetime produces photonic molecules at a ratio of 1:1000 and at a ratio of 1:100 when the Gaussian pulse length is reduced to 10 ps. Without being limited to any particular theory, it is thought that lower Gaussian pulse lengths produce even higher proportions of photonic molecules.

In various aspects, the photonic molecules are produced by a photonic molecule laser. In various aspects, the photonic molecule laser overcomes at least several limitations of conventional unpaired photon lasers including, but not limited to the diffraction limit, and as a result achieves far-field super-resolution for optical imaging (see FIG. 38), deep-subwavelength optical lithography, and multi-photon excitation at low optical power levels (see FIG. 39).

Figure 5:
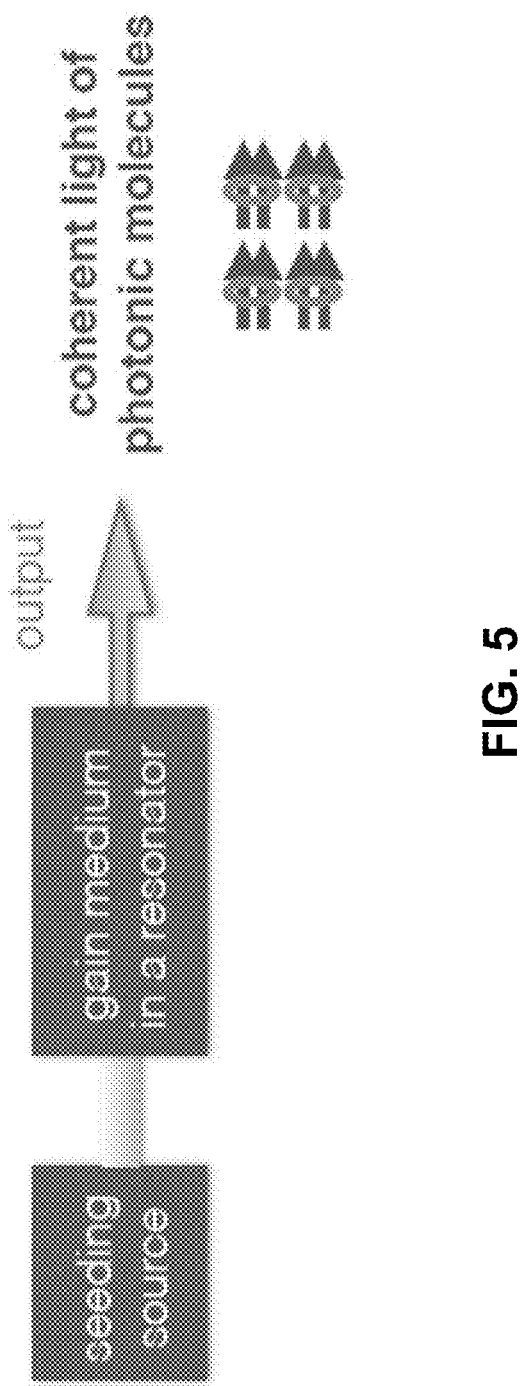
FIG. 5 is a schematic illustration showing the arrangement of various elements of an mLaser device in one aspect.
Figure 6:
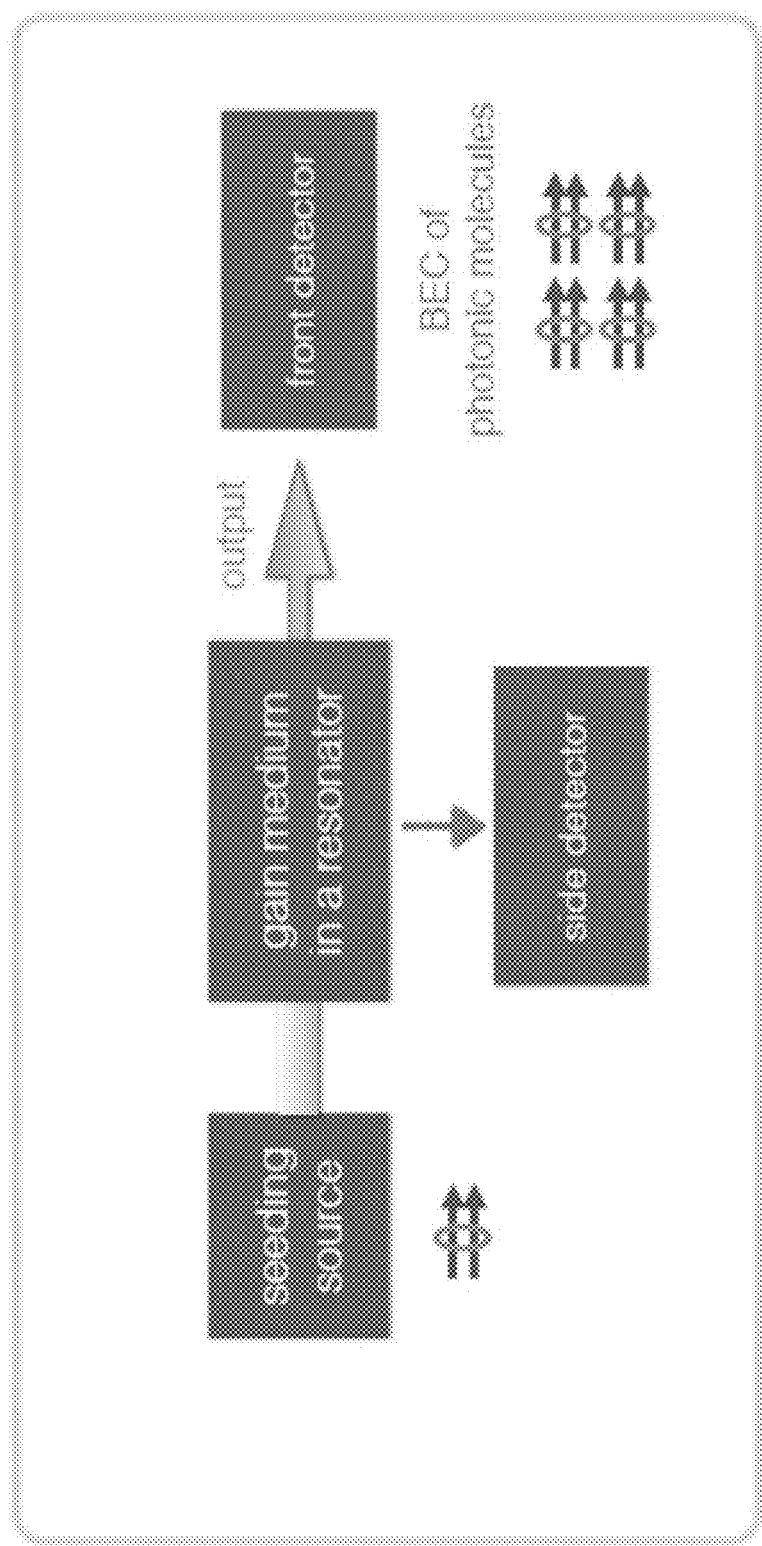
FIG. 6 is a schematic illustration showing the arrangement of various elements of an mLaser system in one aspect.

In one aspect, the photonic molecule laser includes a photonic molecule seeding source operatively coupled to a gain medium as well as an output element operatively coupled to the gain medium, as illustrated in FIG. 5. In another aspect, the photonic molecule laser includes a photonic molecule seeding source operatively coupled to a gain medium, an output element operatively coupled to the gain medium, as well as additional detectors including, but not limited to, a front detector operatively coupled to the output element and/or a side detector operatively coupled to the gain medium, as illustrated in FIG. 6.

Figure 7:
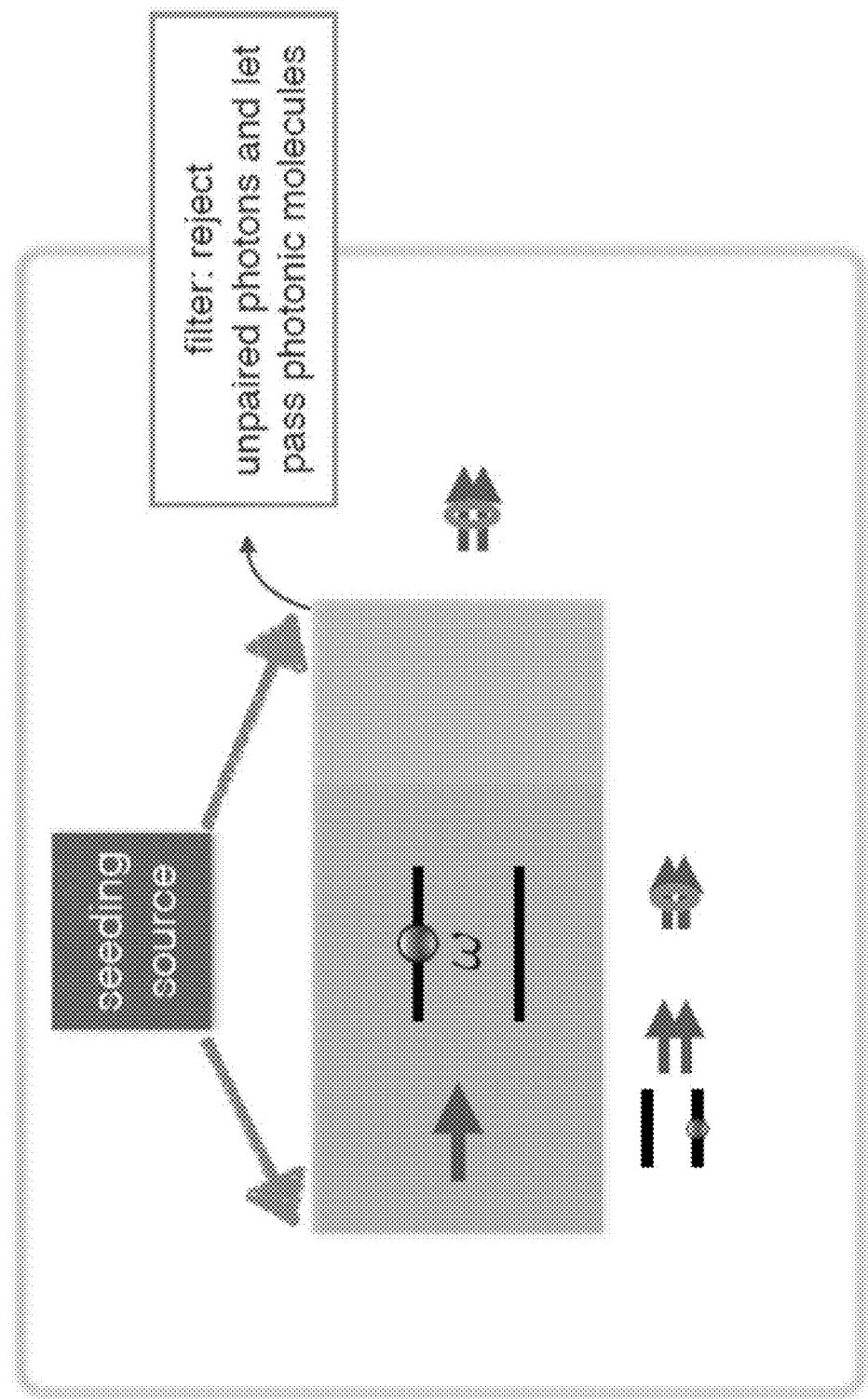
FIG. 7 is a schematic diagram illustrating a seeding source of an mLaser device in one aspect.
Figure 9:
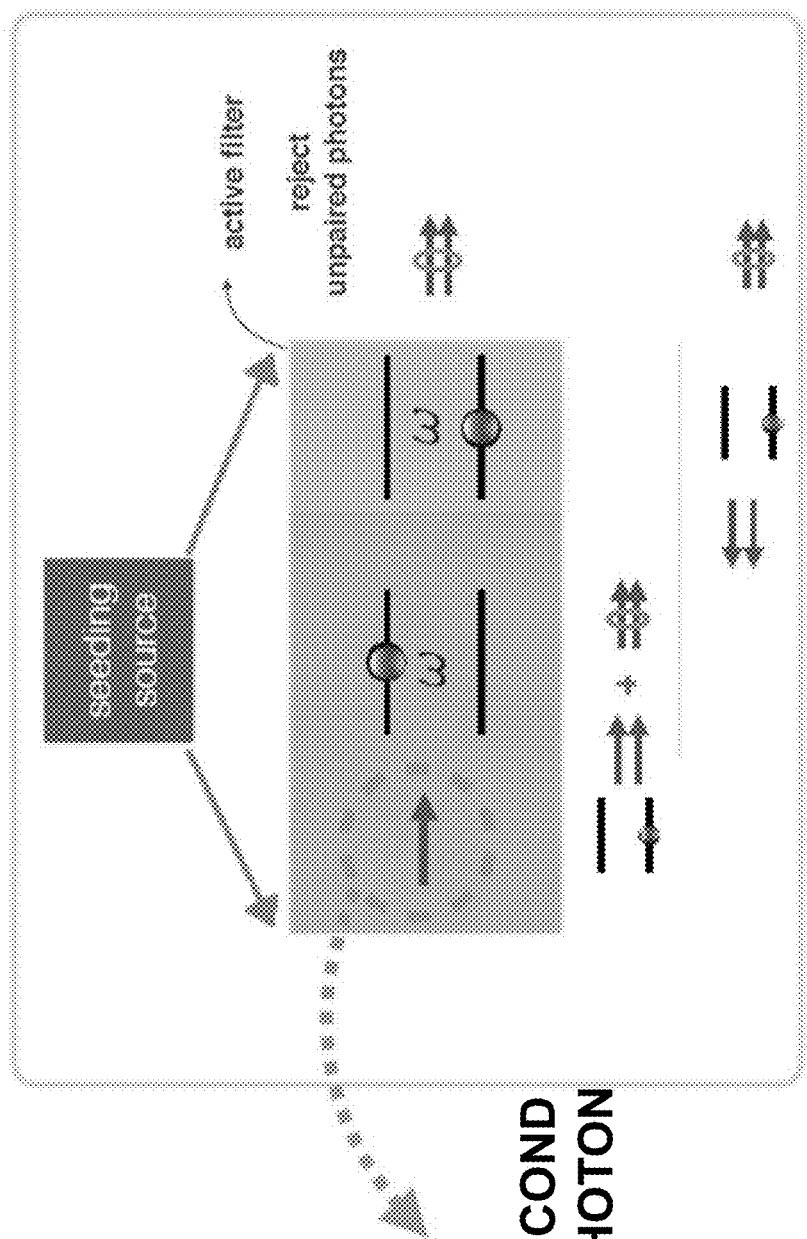
FIG. 9 is a schematic diagram illustrating the production of photonic molecules by a seeding source of an mLaser device in response to a femto-second pump pulse in one aspect.

In one aspect, illustrated schematically in FIGS. 7 and 9, the photonic molecule seeding source includes a laser gain medium (shown in grey) that includes a first face and a second face, a pump source operatively coupled to the first face of the laser gain medium, and a filter operatively coupled to the second face of the laser gain medium. The laser gain medium further includes a plurality of first dopants maintained at a population inverted energy state. Each first dopant in the gain medium has an energy level transition corresponding to a first frequency ($\omega$). The pump source is configured to deliver a laser pulse at the first frequency ($\omega$) with a pulse lifetime of no longer than about one nanosecond and a Gaussian pulse distribution of no more than about ten picoseconds into the first face. Any existing pump source may be incorporated into the photonic molecule seeding source without limitation including, but not limited to arc lamps and laser diodes.

The plurality of first dopants are maintained at a population inverted state and as a result release photonic molecules with a second (composite) frequency ($2\omega$) in response to the laser pulses from the pump source according to the stimulate emission scheme described above and illustrated in FIG. 31. By way of non-limiting example, the laser gain medium may be silicon doped with $Er^{3+}$ dopants.

In various aspects, the dopant is selected based on the desired energy level transition including, but not limited to, the dopants described above for wavelengths of 740 nm and 1480 nm.

The filter in this aspect includes a gain medium with a plurality of the first dopants maintained in a depleted energy state as illustrated in FIG. 9. In various aspects, the filter of the photonic molecule source is configured to block passage of unpaired photons with the first frequency ($\omega$) and to transmit the photonic molecules with the second frequency ($2\omega$) that is generally an n-fold multiple of the first frequency, in which n is the number of photons in the photonic molecule. The photonic molecules may be absorbed and re-emitted by the plurality of first dopants within the filter's gain medium (see FIG. 32) and unpaired photons may be reflected/scattered by the plurality of first dopants (FIG. 33).

Figure 11:
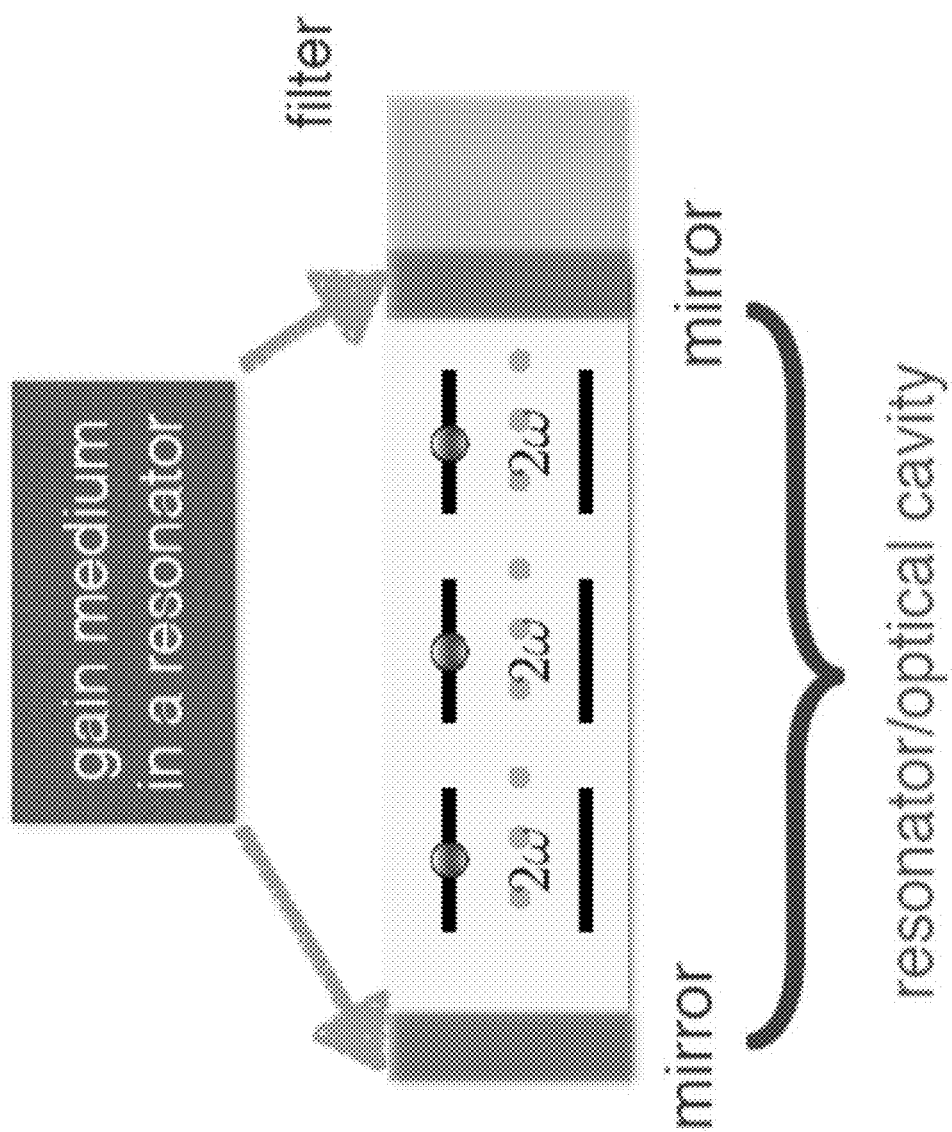
FIG. 11 is a schematic illustration showing the arrangement of various elements of a resonator within an mLaser device according to one aspect.
Figure 12:
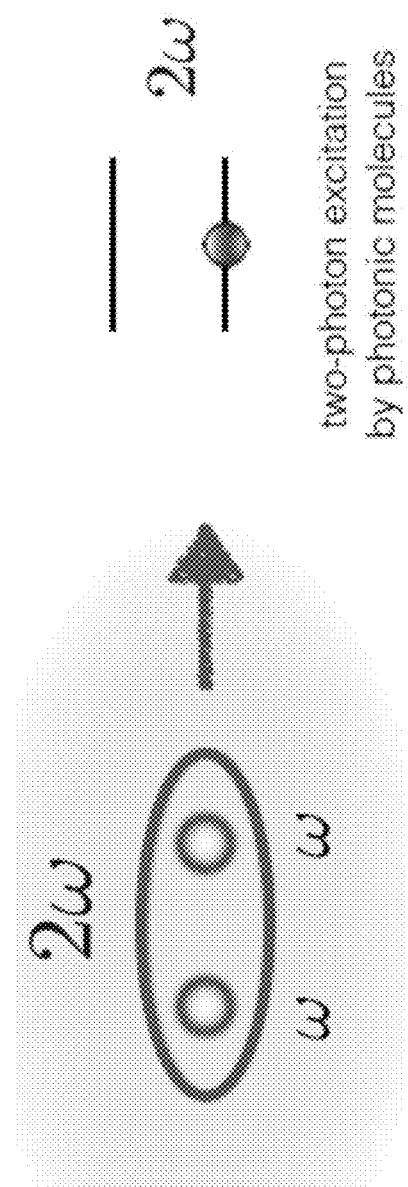
FIG. 12 is a schematic illustration showing two-photon excitation of an atom within a gain medium within an mLaser device by a two-photon photonic molecule according to one aspect.
Figure 13:
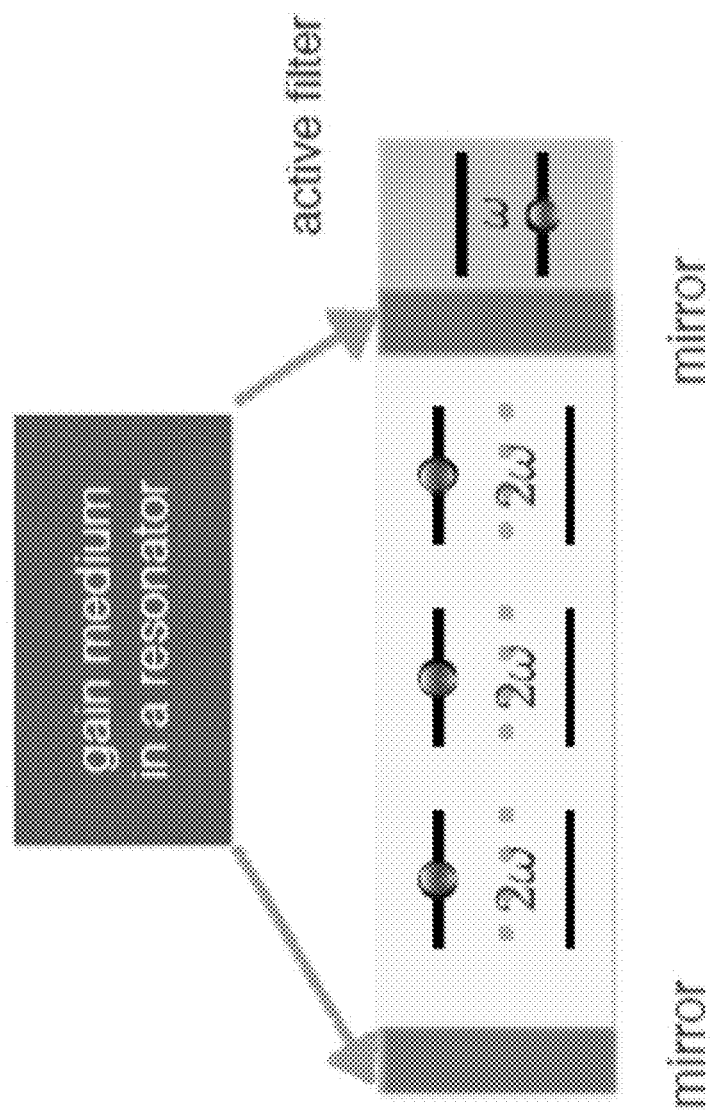
FIG. 13 is a schematic illustration of the resonator illustrated in FIG. 11 showing an active filter according to one aspect.

In various other aspects, the photonic molecule gain medium, illustrated in FIGS. 11 and 13, includes a first face operatively coupled to the photonic molecule source and a second face optically coupled to a second filter. The photonic molecule gain medium also includes a plurality of second dopants maintained at a population inverted energy state that include an energy level transition corresponding to the second frequency ($2\omega$). The incoming photonic molecules produced by the photonic molecule source are amplified by stimulated emission (see FIG. 34). By way of non-limiting example, the laser gain medium may be silicon doped with $Er^{3+}$ dopants.

The second filter coupled to the second face of the photonic molecule gain medium includes a gain medium with a plurality of the first dopants maintained in a depleted energy state as illustrated in FIG. 13. In various aspects, the second filter is configured to block passage of unpaired photons with the first frequency ($\omega$) and to transmit the photonic molecules with the second frequency ($2\omega$) The photonic molecules may be absorbed and re-emitted by the plurality of first dopants within the second filter's gain medium (see FIG. 32) and unpaired photons may be reflected/scattered by the plurality of first dopants (FIG. 33).

In various other aspects, the photonic molecule gain medium may be positioned between two mirrors to form a resonator configured to amplify the photonic molecules as they are reflected in a forward and reverse direction across the gain medium containing the plurality of second dopants. In an aspect, the two mirrors include a first mirror configured to reflect the photonic molecule and a second mirror configured to selectively reflect/transmit the photonic molecules to deliver photonic molecule laser pulses to the output.

In various additional aspects, two or more photonic molecule gain medium elements may be operatively coupled in series. In one aspect, a first photonic molecule gain medium element is operatively coupled to a second photonic molecule gain medium element, and the second photonic molecule gain medium element may be operatively coupled to additional photonic molecule gain medium elements. The first photonic molecule gain medium element is configured to receive and amplify photonic molecules from the photonic molecule source in a single pass, the second photonic molecule gain medium element is configured to receive and amplify photonic molecules from the first photonic molecule gain medium element in a single pass, and so on.

In various aspects, the output of the photonic molecule laser (see FIG. 5) is coupled to the second filter and is configured to modulate the bond length/size of the photonic molecules delivered via the second filter. In one aspect, illustrated in FIG. 16, the output may be a quantum photonic medium that receives an incident beam of photonic molecules from the second filter and delivers an output beam to a desired location as described above. In this aspect, the quantum photonic medium is provided as a waveguide with cross-sectional dimensions of about 5 $\mu$m×5 $\mu$m and a length of about 10 $\mu$m, with operating wavelengths of 1480 nm for the single photons and 740 nm for the dual photon photonic molecules.

Figure 38:
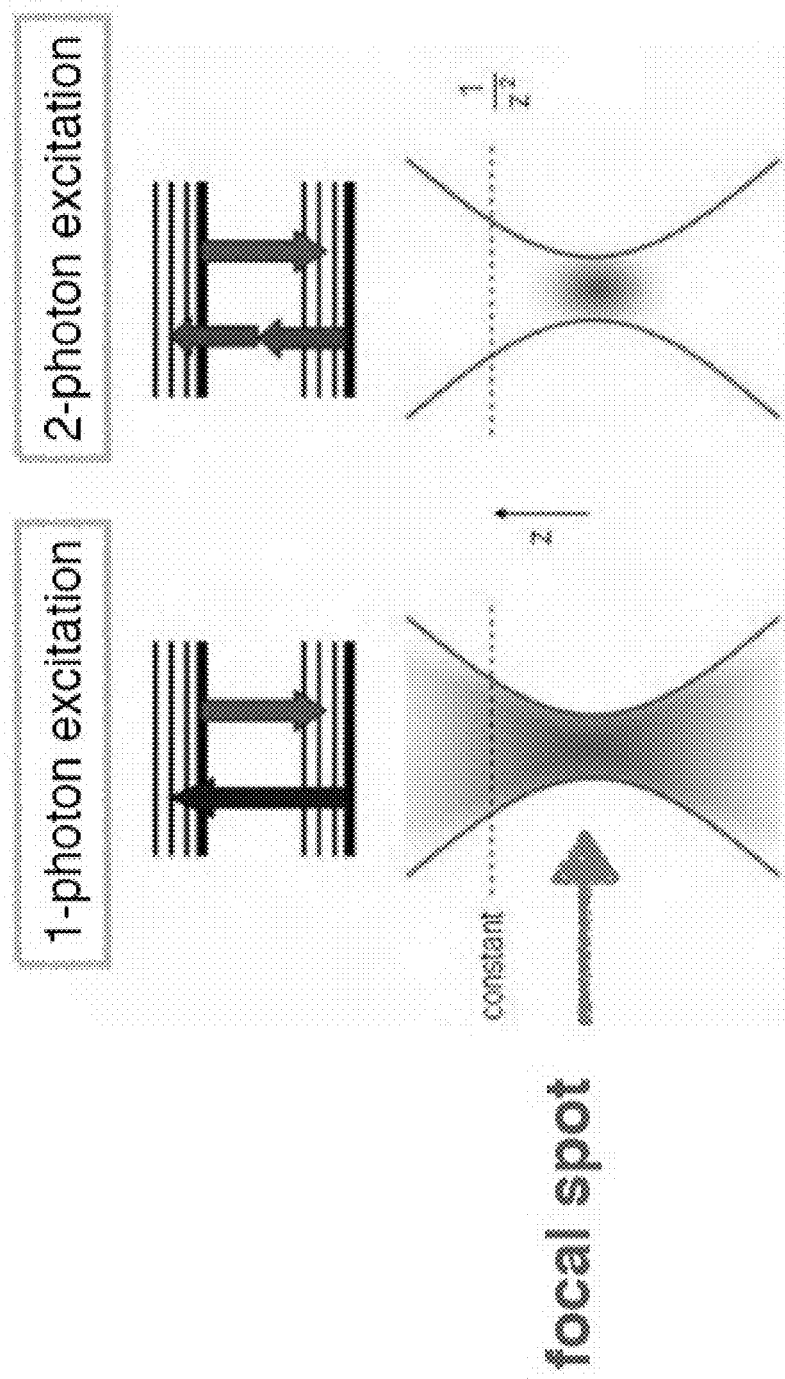
FIG. 38 is a schematic illustration of the advantages of two-photon excitation in fluorescence microscopy.
Figure 39:
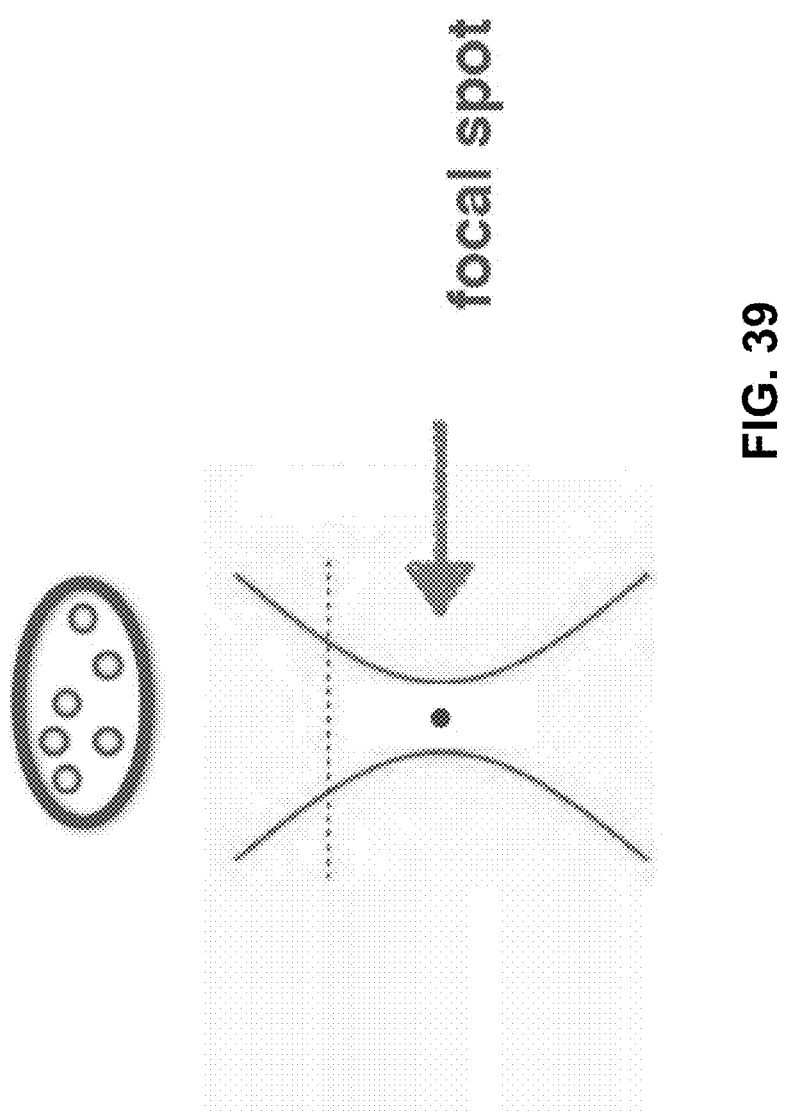
FIG. 39 is a schematic illustration of the advantages of illumination using multi-photon photonic molecules for excitation in fluorescence microscopy.

In various other aspects, the output of the photonic molecule laser is coupled to any device that makes use of energy delivery via photons including, but not limited to, a dual-photon excitation fluorescence microscopy system, or a deep lithographic device. Without being limited to any particular theory, the use of photonic molecules enables illumination at a much higher resolution relative to comparable photons in a single photon form by overcoming the diffraction limit, as illustrated in FIG. 38. Because the wavelength of a photonic molecule comprising n photons is 1/n of the single-photon wavelength, a beam comprising photonic molecules may be focused to a much smaller beam cross-section that a beam of single photons with the same single-photon wavelength.

Figure 29:
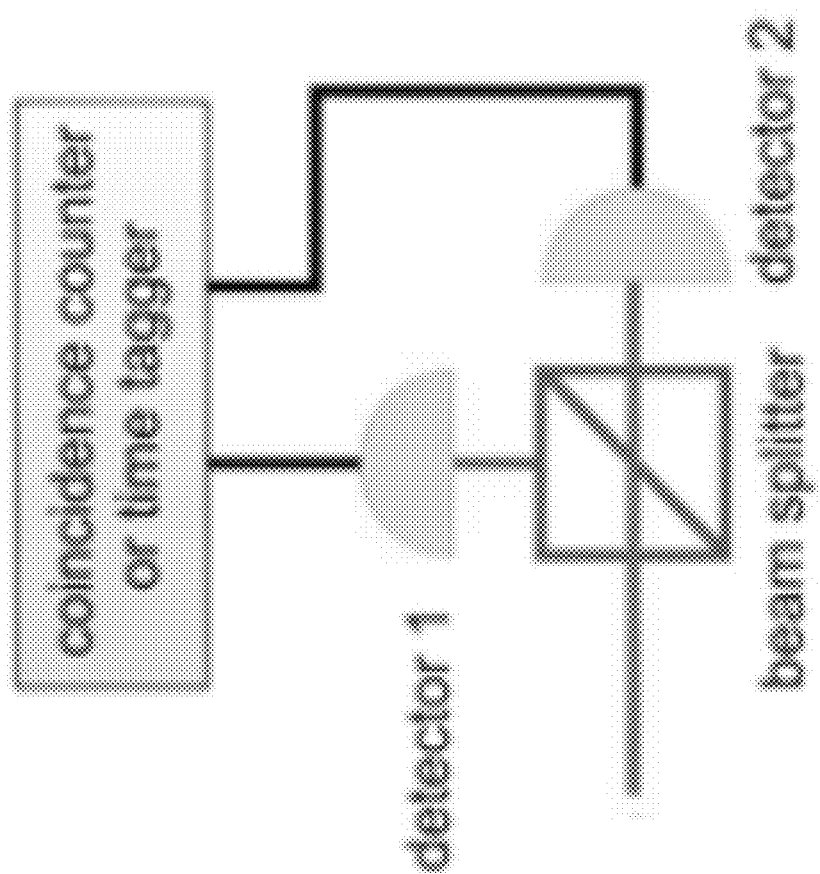
FIG. 29 is a schematic illustration showing an arrangement of elements of a multi-photon measurement device in one aspect.
Figure 46:
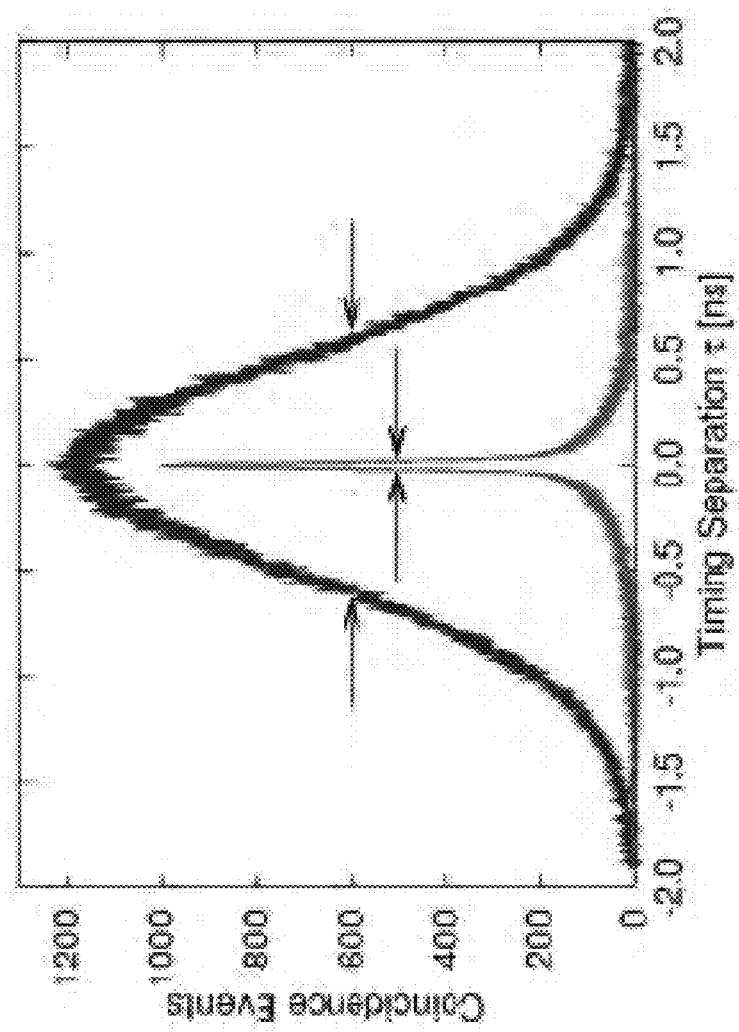
FIG. 46 is a graph showing the number of coincidence events as a function of timing separation for relatively high speed propagation (blue curve) and for relatively low speed propagation (red curve) of two-photon photonic molecules.

Referring again to FIG. 6, the photonic molecule laser includes a front detector and/or side detector in various other aspects. In one aspect, the front and/or side detector is configured to detect photonic molecules according to a coincidence counter scheme illustrated schematically in FIG. 29, in which each photonic molecule is directed into a beam splitter with detectors coupled to each output of the beam splitter. The two detectors in turn are operatively coupled to a coincidence counter or time lagger that detects photonic molecules based on the temporal separation of detected photons. By way of non-limiting example, FIG. 46 is a graph summarizing the measurements obtained according to a coincidence counter scheme for relatively high speed propagation (blue curve) and for relatively low speed propagation (red curve) of two-photon photonic molecules.

Figure 47:
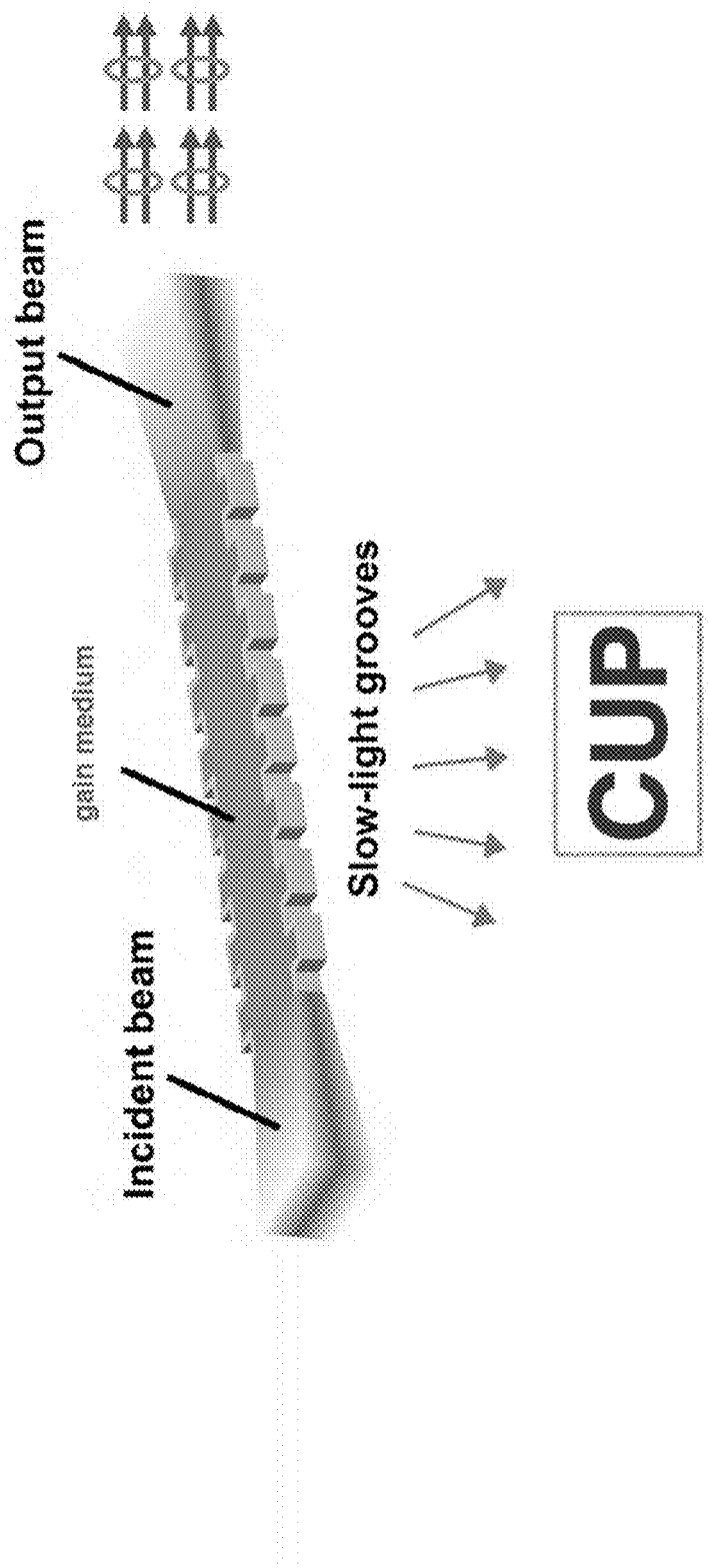
FIG. 47 is a schematic illustration of an experimental set-up to observe the formation of photonic molecules within a slow-light waveguide using CUP high-speed imaging.
Figure 48:
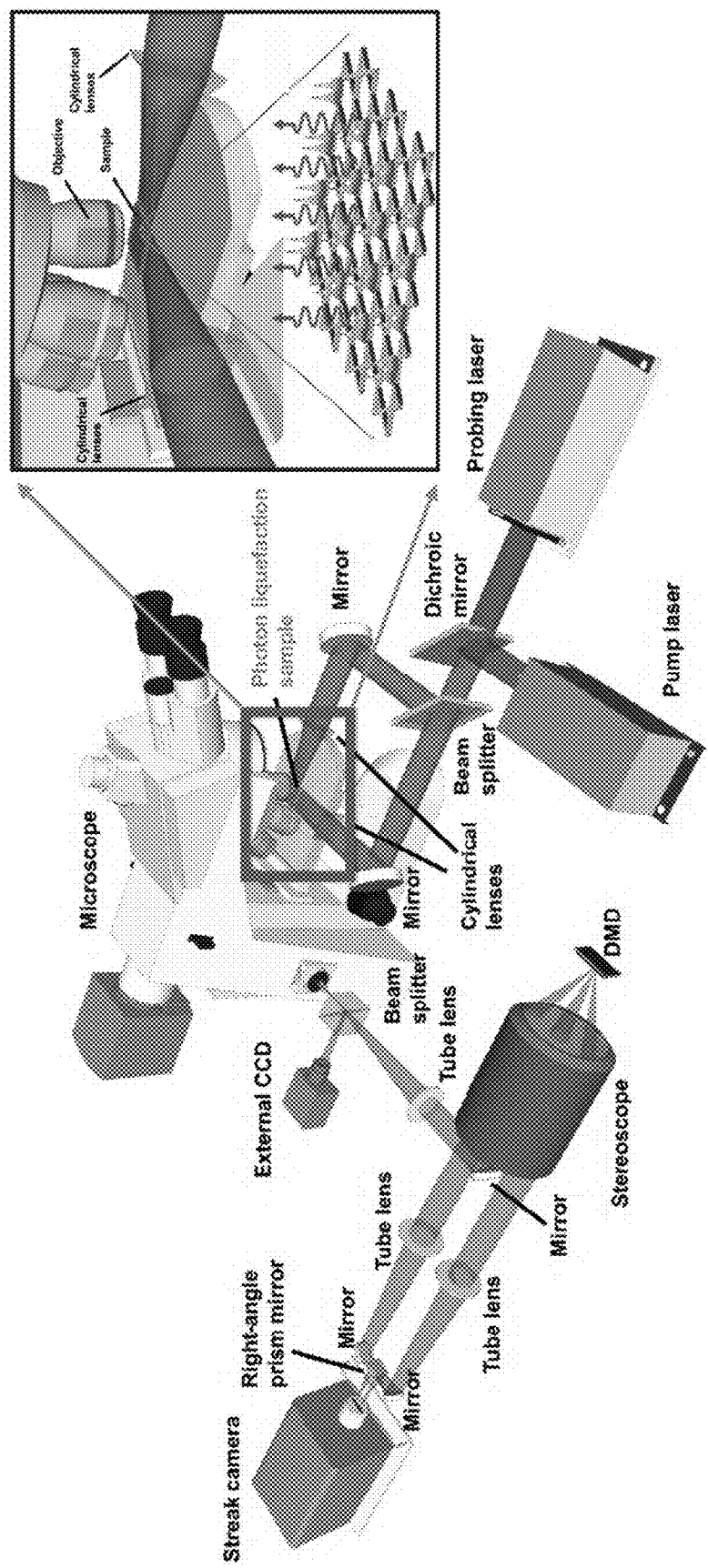
FIG. 48 is a schematic illustration of another experimental set-up to observe the formation of photonic molecules within a slow-light waveguide using CUP high-speed imaging.

In another aspect, the side detector is a high speed video system including, but not limited to, a compressed-sensing ultrafast photography system as described in U.S. patent application Ser. No. 15/505,853, which is incorporated by reference herein in its entirety. In this aspect, the CUP system may be coupled to the photonic molecule gain medium to record the formation of photonic molecules, as illustrated in FIGS. 47 and 48. Without being limited to any particular theory, the side detector detects amplified spontaneous emission within the gain medium, which should be largely suppressed when the coherent states of photonic molecules are formed.

EXAMPLES

The following examples illustrate various aspects of the disclosure.

Example 1: Excitation Efficiency of Photonic Molecules

Without being limited to any particular theory, photonic molecules, the bound states of photons, enable efficient nonlinear two-photon excitation, due primarily to the energy anti-correlation and to the temporal proximity between the constituent photons. It was numerically and analytically demonstrated than an order-of-magnitude improvement of the excitation efficiency per photon was enabled by the photonic molecules over the ultrashort pulses from a laser. Possible approaches for generating the photonic molecules in semiconductor platforms were also investigated.

The bound states were typically formed by charged particles through direct or mediated interactions between the constituent particles. It has been demonstrated theoretically that photons, which do not carry electric charges, also may form a quantum photonic bound state, referred to as a photonic molecule (PM). A 2-photon molecule consisting of two entangled identical photons has been confirmed experimentally. The 2-photon molecule was characterized by two independent time scales: the coherence time T, which refers to the modulated temporal duration of each photon, and the correlation time z that describes the temporal width of the relative wavefunction of the entangled photons.

The photonic molecules were also characterized by additional salient features. Photonic molecules were characterized by a joint two-photon coincidence probability that decayed exponentially in proportion to $e^{-\Delta t/\tau}$ as the difference of the photon arrival times $\Delta t$ increased. Another prominent feature of photonic molecules was the cusp at the second-order correlation function, which exhibited the photonic bunching behavior and was characteristic of the two-photon bound state. In addition, the energies between the constituent photons within a photonic molecule were anti-correlated. For a 2-photon molecule of average energy $2\hbar\omega$, the two photon quantum state in the frequency space was described by $\int b(\Delta)|\omega+\Delta\rangle|\omega+\Delta\rangle d\Delta$, where the distribution coefficient $b(\Delta)$ was a Lorentzian function when $\tau \ll T$, and had more pronounced tails than a Gaussian function for large $\Delta$. Once formed, the photonic molecules may propagate in a linear medium or vacuum without the need of the nonlinear optical medium.

These photonic molecules were anticipated to facilitate an array of scientific and industrial applications, including three-dimensional optical memory, sensitivity enhancement in the molecular Stark effect, and coherent quantum control of multi-photon transitions. The unique quantum optical properties of the 2-photon molecules are thought to be capable of enabling efficient nonlinear two-photon excitation when individual photonic molecules were used as the illuminating source.

The invention of two-photon fluorescence light microscopy made possible three-dimensional in vivo imaging of thick cells and tissues at millimeter scales. Two-photon excitation (TPE) was described as a nonlinear fluorescence process in which a fluorophore was excited by nearly simultaneous absorption of two lower energy photons (typically in the infrared spectral range, in contrast to the UV energy photon in single-photon transition) via short-lived intermediate states (lifetime less than about $10^{-15}$ s). A longer excitation wavelength may lead to increased penetration because both the absorption and the reduced scattering coefficients are decreased in the typical spectral region. As a result, unprecedented two-photon imaging depth of 1.6 mm in the mouse cortex in vivo has been reported. Because two-photon absorption was characterized as a nonlinear second-order process with an exceedingly small two-photon cross-section on the order of 1 GM (1 GM=$10^{-50}$ cm$^4$ s/photon), high-photon flux needed to be delivered to the sample to generate efficient absorption, which was typically achieved using ultrashort pulsed laser excitation. Nonetheless, the excitation efficiency of the fluorescent molecules was determined to be exceptionally low. By way of non-limiting example, for a photon flux of $2\times10^{21}$ photons per pulse (photons/m$^2$) under representative TPE conditions, merely $5\times10^3$ photons were found to be absorbed per fluorophore. The finite quantum yield (~5% to ~90%) further decreased the excitation efficiency.

Without being limited to any particular theory, two characteristics of the two photons of a TPE event are thought to influence excitation efficiency. In the frequency domain, a sum of the energies of the two photons matching the energy gap between the fluorescence molecule's ground and excited states is thought to increase the TPE probability. In the time domain, the nearly simultaneously arrival of the two photons at the fluorescence molecule is also thought to increase the TPE probability. These two characteristics were not typically representative of the characteristics of uncorrelated single photons in an ultrashort pulse from a conventional laser. In contrast, 2-photon molecules with a short correlation time $\tau$ may satisfy both of the above conditions and may concurrently and consequently enhance the efficiency of two-photon excitation as compared to excitation by uncorrelated photons.

Figure 49:
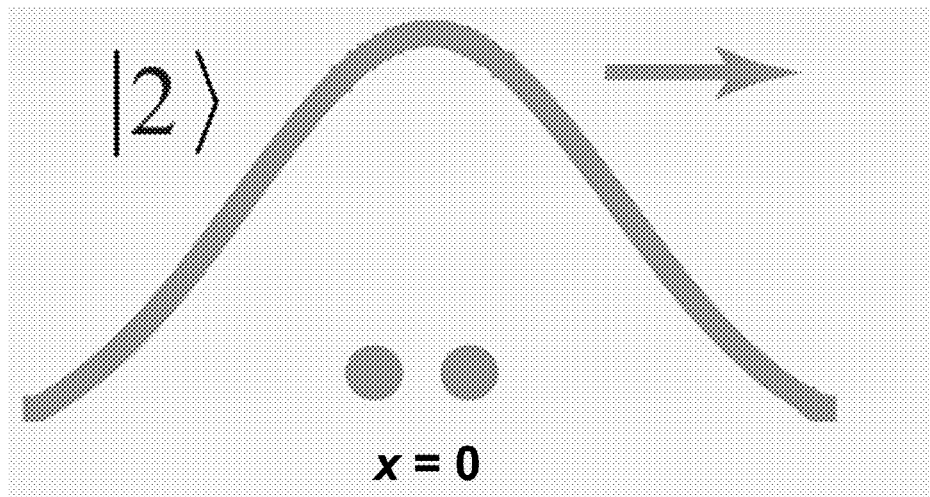
FIG. 49 is a schematic illustration of a two-photon excitation process of a fluorescence molecule in a single-mode optical waveguide.

By way of non-limiting example, a two-photon excitation process of a fluorescence molecule in a single-mode optical waveguide is illustrated schematically in FIG. 49 and FIG.

Figure 50:
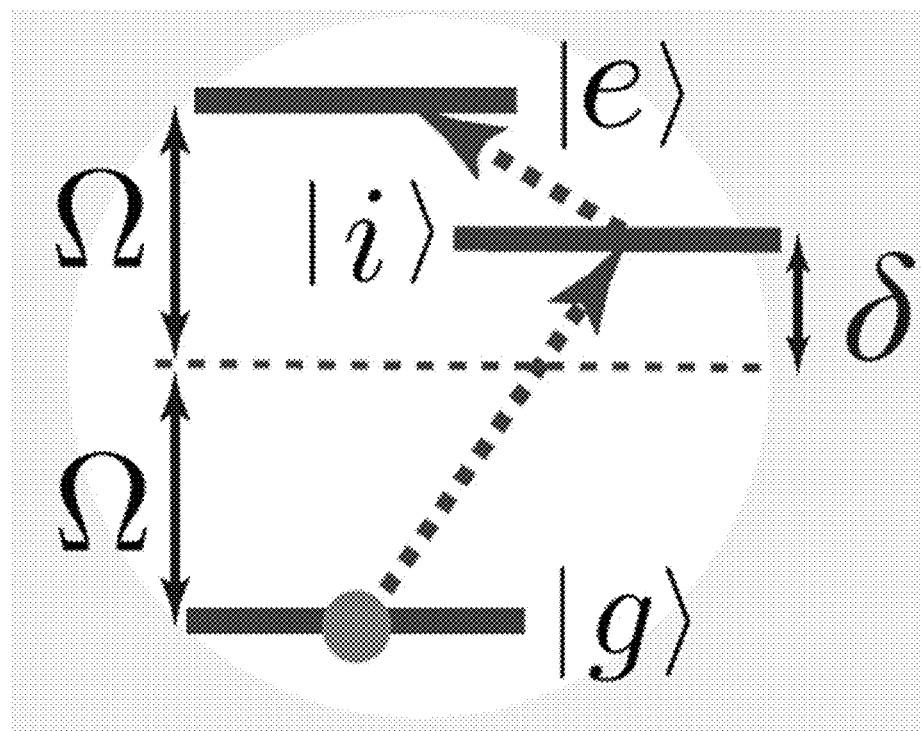
FIG. 50 is a schematic illustration of three-level atom representation of a fluorescence molecule.

50. The photonic molecule was located at x=0 (see FIG. 49) and was modeled as a three-level atom (see FIG. 50), where the ground state $|g\rangle$ (energy $\hbar\Omega_g$) and the excited state $|e\rangle$ (energy $\hbar\Omega_e$) have the same parity, so that single-photon transitions from $|g\rangle$ to $|e\rangle$ are parity-forbidden, and only a two-photon excitation via an intermediate state $|i\rangle$ (energy $\hbar\Omega_i$) was allowed. The intermediate state represented one of a complete set of eigenstates which had non-vanishing dipole matrix elements with $|g\rangle$ and $|e\rangle$. $\Omega_e - \Omega_g = 2\Omega$ corresponded to the transition frequency. The frequency detuning of the intermediate state $|i\rangle$ was defined as $\delta = \Omega_i - \Omega_g - \Omega$.

In this non-limiting example, the fluorescence molecule was excited by three different excitation schemes: a long 1 ns two-photon pulse from a conventional laser, a short 200 fs two-photon pulse from a conventional laser, and a 2-photon molecule with a correlation time $\tau=50$ ps and a coherence time T=1 ns.

Figure 52:
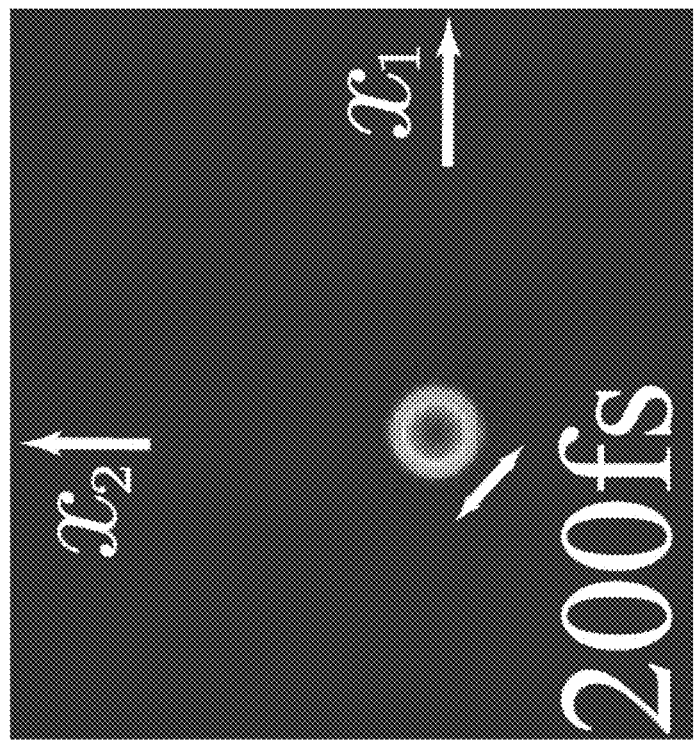
FIG. 52 is a map summarizing two-photon probability density of a short Gaussian pulse with T=200 fs.
Figure 51:
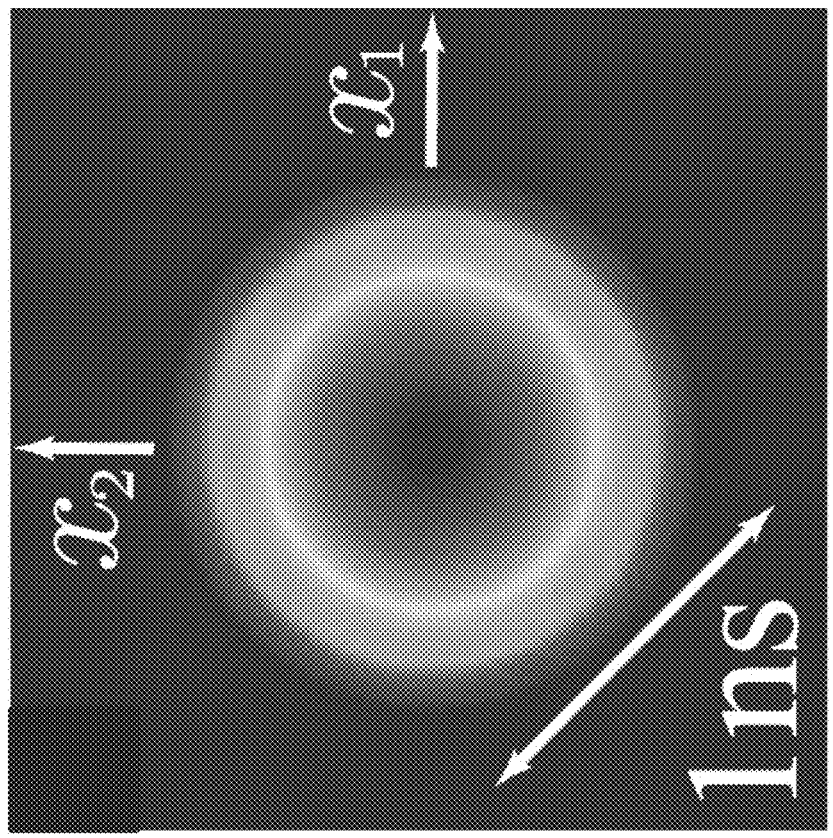
FIG. 51 is a map summarizing two-photon probability density of a long Gaussian pulse with T=1 ns.
Figure 54:
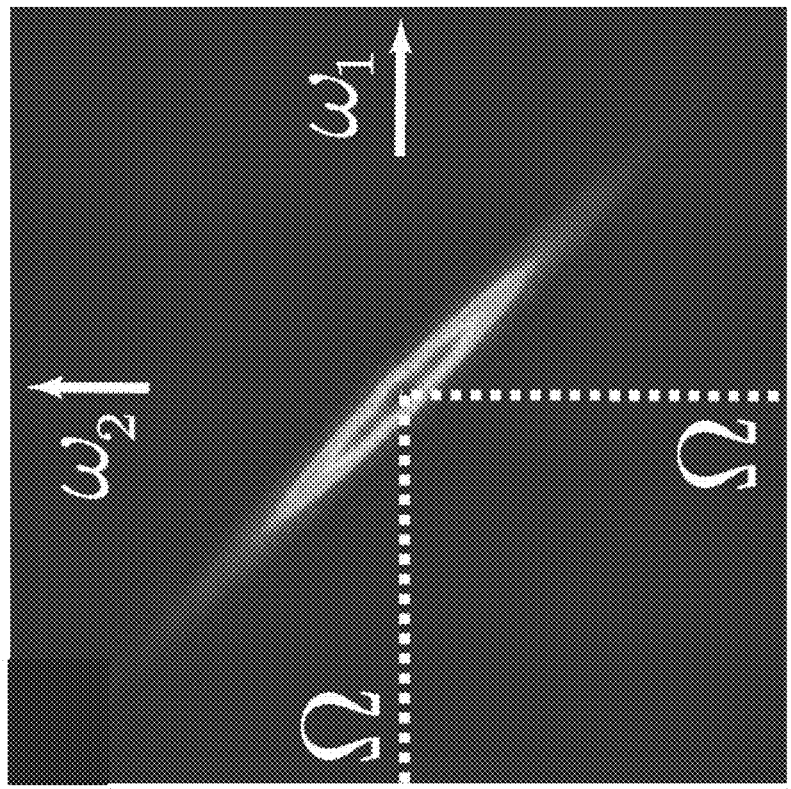
FIG. 54 is a map summarizing a joint frequency spectrum of the photonic molecule shown in FIG. 53.

The 1 ns and 200 fs two-photon pulses consisted of two identically overlapping Gaussian wavepackets with spatial width $\sigma$ and central frequency $\Omega$, and was described by $\phi_{in}(x_1, x_2) = 1/(\sqrt{2\pi}\sigma) \exp[i\Omega(x_1+x_2)/v_g - (x_1-x_0)^2/4\sigma^2 - (x_2-x_0)^2/4\sigma^2]$, where $x_1$ and $x_2$ corresponded to the location of each photon in the input port of the waveguide, and $x_0$ is the center position of the input pulse (the results did not depend on the choice of $x_0$ so long as the initial pulse did not overlap with the molecule). Such an input was a product state, meaning that the two photons were completely uncorrelated. The coherence time was defined as the duration of the pulse $T=2\sigma/v_g$. FIGS. 51 and 52 are color maps showing the probability densities $|\phi_{in}|^2$ normalized to unity when integrated over $x_1$ and $x_2$ for the 1 ns and 200 fs two-photon pulses, respectively.

Figure 53:
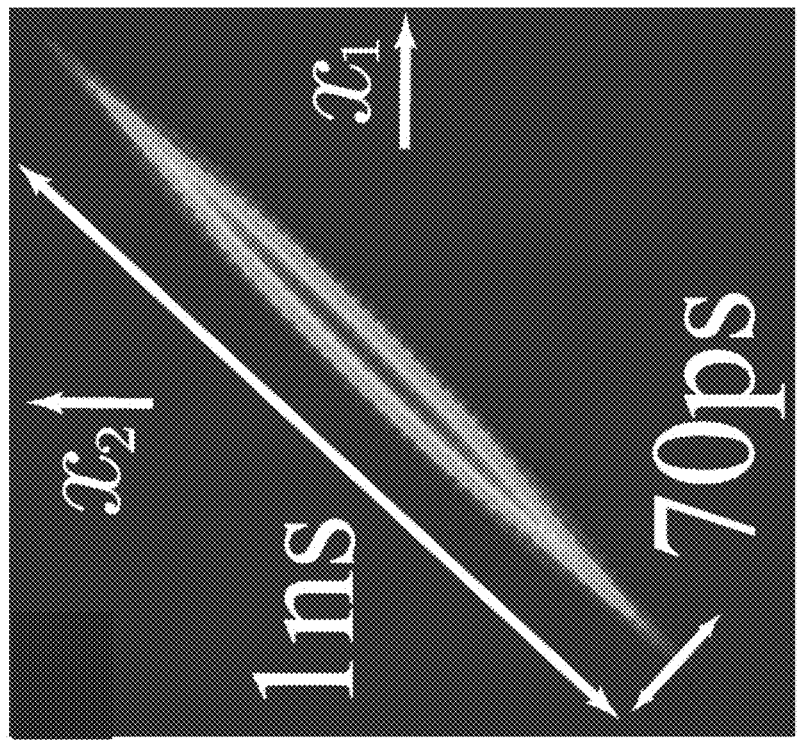
FIG. 53 is a map summarizing two-photon probability density of a photonic molecule with T=1 ns and $\tau$=50 ps.

The Gaussian modulated photonic molecule was described by $\phi_{in}(x_1, x_2) = N \exp[-\gamma|x_1-x_2|/v_g + i\Omega(x_1+x_2)/v_g - (x_1-x_0)^2/4\sigma_m^2 - (x_2-x_0)^2/4\sigma_m^2]$, where N was the normalization factor. The center frequency of each photon of the photonic molecule was $\Omega$. The coherence time was defined by $T \equiv 2\sigma m/v_g = 1$ ns, and the correlation time was defined by $\tau = 2\pi/\gamma = 50$ ps. FIG. 53 is a color map showing the probability densities $|\phi in|^2$ normalized to unity when integrated over $x_1$ and $x_2$ for the photonic molecule. The anti-correlation takes place within the temporal window T.

The Hamiltonian of the entire system was expressed as:

$$\frac{H}{\hbar} = \int dx \left\{ -iv_g c_R^\dagger(x) + iv_g c_L^\dagger(x) \frac{\partial}{\partial x} c_L(x) + \delta(x)[\Sigma_{j=L,R} c_j(x)(V_1 a_i^\dagger a_g + V_2 a_e^\dagger a_i) + h.c.] \right\} + \Omega_g a_g^\dagger a_g + \Omega_i a_i^\dagger a_i + (\Omega_e + \Delta_a - i\gamma_a) a_e^\dagger a_e \quad \text{Eqn. (1)}$$

where the first two terms of Eqn. (1) described the waveguided photons propagating in the right and left directions, respectively, with a group velocity $v_g \cdot c_R^\dagger(x)(c_R(x))$ was the creation (annihilation) operator for the right-moving photon, and $c_L^\dagger(x)(c_L(x))$ was similarly defined for the left-moving photon. The next term of Eqn. (1) described the absorption of a photon and the excitation of the molecule from $|g\rangle$ to $|i\rangle$ with a coupling strength $V_1$, or from $|i\rangle$ to $|e\rangle$ with a coupling strength $V_2$. Here $a_{g,i,e}^\dagger (a_{g,i,e})$ was the creation (annihilation) operator of the corresponding state. The h.c. term referred to the hermitian conjugate and described the time-reversed relaxation process with an emitted photon. The last three terms of Eqn. (1) described the energy of the molecular states. The molecular energy renormalization $\Delta_a - i\gamma_a$ resulted from coupling with the ambient environment, which accounted for the dissipation and dephasing of the excited molecular state. The renormalization term was omitted from Eqn. (1).

To simplify the description, henceforth it was also assumed that $V_1 = V_2 = V$. Thus the decay rate of the excited states into the waveguided mode was $\Gamma = V^2/v_g$ and $\tau_0 = 2\pi/\Gamma$ corresponded to the spontaneous emission lifetime of the photonic molecule, assumed to be about 50 ps.

Figure 55A:
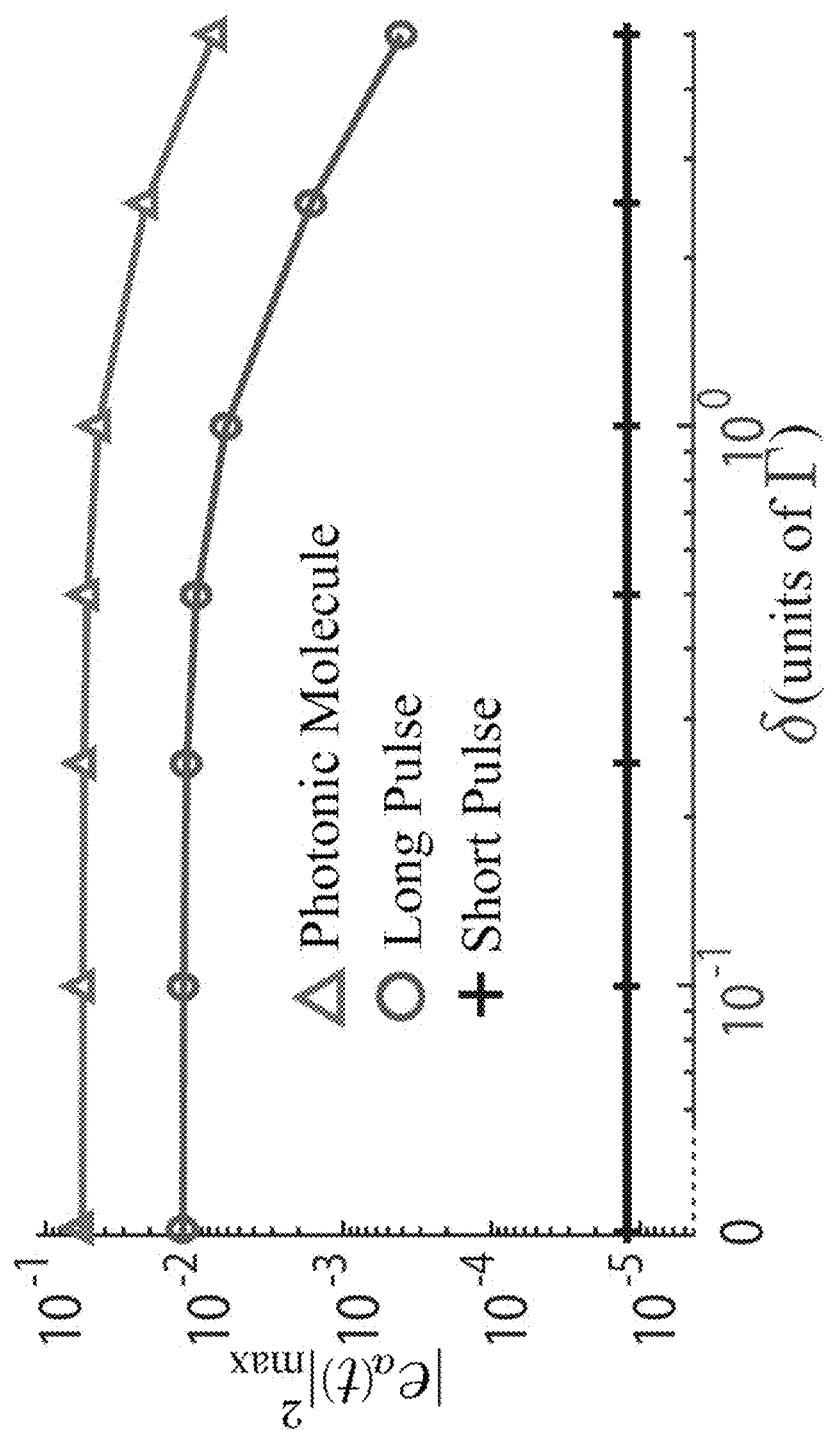
FIG. 55A is a graph summarizing numerical results of the peak value of molecular excitation $|e_a(t)|^2$ versus frequency detuning $\delta$ for three excitation schemes.
Figure 55B:
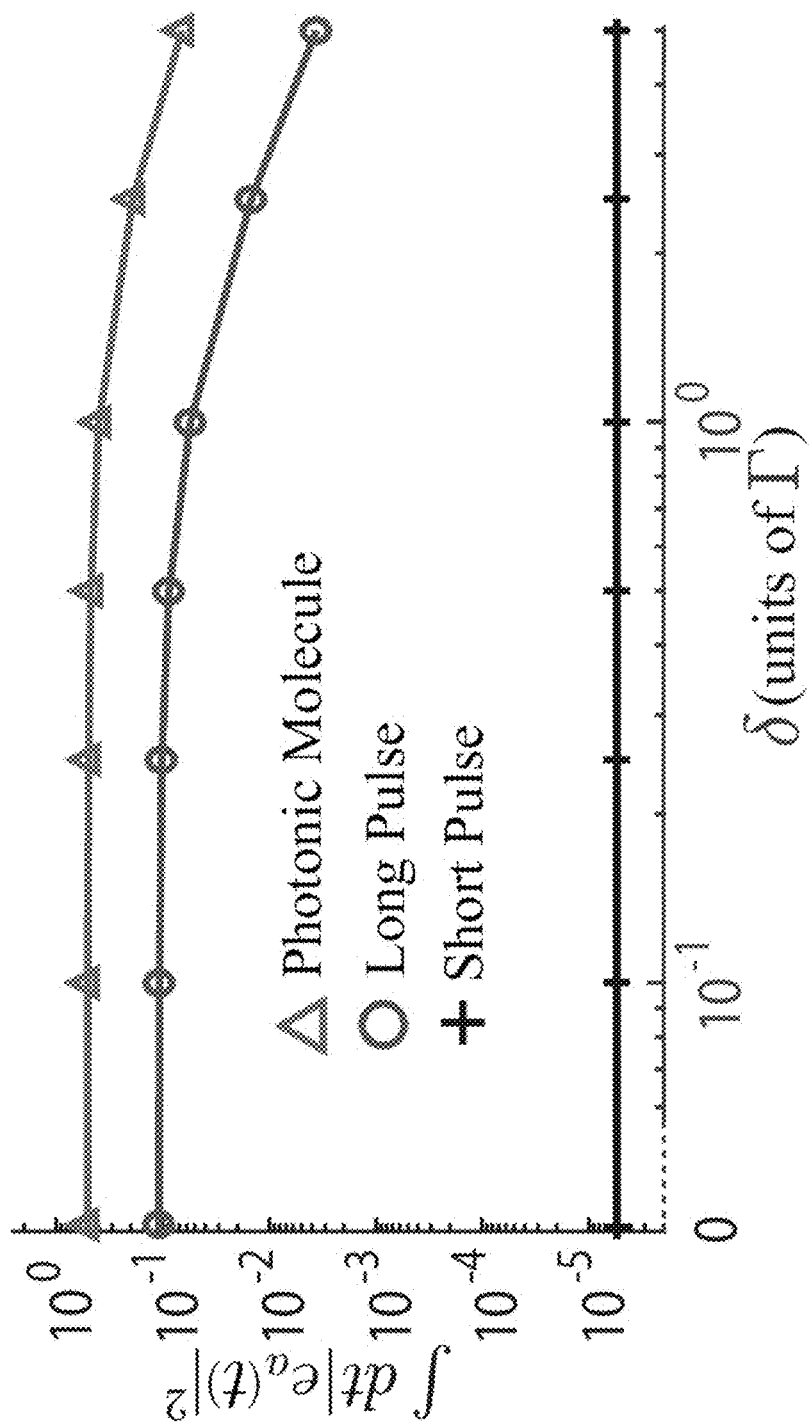
FIG. 55B is a graph summarizing numerical results of the excitation efficiency versus $\delta$.

The equations of motion of the scattering process were given by the Schrödinger equation $\hbar \partial_t |\phi(t)\rangle = H|\phi(t)\rangle$, where the system wavefunction $|\phi(t)\rangle$ described both the photons and the fluorescent molecule, with the specified photonic excitation and the molecular state as the initial conditions. The equations of motion were evolved numerically in time to trace out the full spatiotemporal dynamics of the scattering process, to which end efficient pseudospectral codes were developed. In particular, the excitation amplitude $e_a(t)$ of the excited molecular state $|e\rangle$ was recorded for each excitation scheme (PM: Δ, long pulse: ○, short pulse: +). FIG. 55A is a graph of the maximum value of $|e_a(t)|^2$ for varying detuning $\delta$. FIG. 55B is a graph of the excitation efficiency $\int |e_a(t)|^2 dt$ as integrated over the temporal duration of the photonic excitation. Multiplied by the quantum yield η, the quantity $\eta \int |e_a(t)|^2 dt$ was proportional to the number of fluorescence photons (fluorescence signal strength).

Numerically, it was found that, up to $\delta \approx 4\Gamma$ (small detuning limit), the excitation efficiency of the photonic molecule outperformed that of the short and that of the long two-photon conventional laser pulses. As the frequency detuning was much less than the frequency bandwidth of the short pulse ($\leq 1.6\%$), the excitation efficiency by a short pulse remained constant, as illustrated in FIG. 55A and FIG. 55B. The excitation efficiency of the photonic molecule and the long pulse, however, decreased gradually. For large frequency detuning, as is the case for typical fluorescence molecules ($\delta \approx 10^4 \Gamma$), the excitation efficiency for all excitation schemes became exponentially small and an accurate numerical computation of the efficiency was extremely challenging.

Example 2: Time-Frequency Conjugate Model for Photonic Molecules

To estimate the excitation efficiency of fluorescence molecules using the three illumination schemes described in Ex. 1 for large frequency detuning conditions, as is the case for typical fluorescence molecules ($\delta \approx 10^4 \Gamma$) a time-frequency conjugate (TFC) model for computing the order of magnitude of the excitation efficiency was developed as described below. As will be seen below, at the small detuning limit, the TFC model agreed well with the rigorous numerical results for all three excitation schemes previously described in Ex. 1. At the large detuning limit, the predicted short-pulse excitation efficiency was compatible with the results inferred from the experiments.

The TFC model incorporated the full pulse nature to account for the TPE in both the time and the frequency domain. In the time domain, the joint probability density of two photons to arrive at the fluorescence molecule was given by the second order correlation function $G^{(2)}(t_1, t_2) \equiv \langle |\hat{a}^\dagger(t_2) \hat{a}^\dagger(t_1) \hat{a}(t_1) \hat{a}(t_2)|\phi_{in}\rangle$, where $|\phi_{in}\rangle$ was the input two-photon state and $\hat{a}(t_1)$ was the photon annihilation operator evaluated at the location of the fluorescence molecule. After being excited by the first photon, the amplitude of the intermediate state $|i\rangle$ of the molecule became $e^{-(t_2-t_1)/\tau_0}$ when the second photon arrived, due to the spontaneous decay of the intermediate state. In the frequency domain, for the frequency component ω of an illuminating photon, the excitation amplitude of the electronic transition between two states with a frequency detuning δ was assumed to be the same as that from a two-level transition $A_{+\delta}(\omega)=\sqrt{\Gamma}/(\omega-\Omega-\delta+i\Gamma)$. Taking into account the temporal and the frequency contributions, the excitation efficiency $\int |e_a(t)|^2 dt$ was given by $\kappa P_t \times P_f$, where:

$$P_t = \int_{-\infty}^{+\infty} d\Delta t G^{(2)}(t, t+\Delta t) e^{-\Gamma \Delta t} \quad \text{Eqn. (2)}$$

with $\Delta t = t_2 - t_1$, and $P_f$ was $$\left| \int\int \frac{d\omega_1 d\omega_2}{2\pi} F(\omega_1) A_{+\delta}(\omega_1) F(\omega_2 | \omega_1) A_{-\delta}(\omega_2) \right|^2 \quad \text{Eqn. (3)}$$

where $F(\omega_1)$ was the frequency distribution of the first arrival photon, and $F(\omega_2|\omega_1)$ was the conditional frequency distribution of the second photon. κ accounted for all other matrix elements of the transitions.

The TFC model was applied to all three excitation schemes. For the Gaussian pulses from a conventional laser, the two photons were independent and one had $F(\omega_2|\omega_1)=F(\omega_2)$. Thus the excitation efficiency was $$K \left( \int\int \frac{2}{\pi T^2} e^{-\frac{2(t-t_0)^2}{T^2} - \frac{2(t+\Delta t-t_0)^2}{T^2} - \frac{\Delta t}{T_0}} d\Delta t dt \right) \times \quad \text{Eqn. (4)}$$

$$\left| \int\int \frac{d\omega_1 d\omega_2}{(2\pi)^2} \frac{e^{-(\omega_1-\Omega)^2 \frac{T^2}{4} - (\omega_2-\Omega)^2 \frac{T^2}{4} T\Gamma}}{(\omega_2 - \Omega - \delta + i\Gamma)(\omega_2 - \Omega + \delta + i\Gamma)} \right|^2$$

where $t_0 = -x_0/v_g$ was an irrelevant reference point. In contrast, for a 2-photon molecule, the frequency distribution was essentially determined by the Fourier transform of the relative wavefunction when τ<<T:

$$\int\int dx_1 dx_2 N' e^{-\frac{\gamma}{v_g}(x_1-x_2) + i\frac{\Omega}{v_g}(x_1+x_2) - ik_1 x_1 - ik_2 x_2} = \quad \text{Eqn. (5)}$$

$$\frac{N'}{\gamma + i(\omega_1 - \Omega)} \delta(\omega_1 + \omega_2 - 2\Omega)$$

where N' was a normalization factor with dimension $s^{-1}$ and $\omega_{1,2} = k_{1,2} v_g$. Thus the frequency distribution of the first photon was Lorentzian with $F(\omega 1) = N'/(\gamma + i(\omega_1 - \Omega))$ and the frequency distribution of the second photon was $F(\omega_2|\omega_1) = \delta(\omega_1 + \omega_2 - 2\Omega)$. Together, the excitation efficiency was:

$$K \left( \int\int |N'|^2 e^{-\frac{4(t-t_0)^2}{T^2} - \frac{4\Delta t(t-t_0)^2}{T^2} - \frac{\Delta t}{T_0} - \frac{\sqrt{2}\Delta t}{\tau}} d\Delta t dt \right) \times \quad \text{Eqn. (6)}$$

$$\left| \int \frac{d\omega}{2\pi} \frac{iN'\Gamma}{(\omega - \Omega - i\gamma)[(\omega - \Omega - \delta)^2 + \Gamma^2]} \right|^2$$

The temporal part was approximately equal to $|N'|^2 T \sqrt{\pi}/(2/\tau_0 + 2/\tau)$ when τ<<T (the limit of practical interest). For large detuning, $P_f \propto 1/\delta^2$ as the integrand was maximized at $\omega = \Omega + \delta$. In contrast, for short pulses, $P_f \propto e^{-\delta^2 T^2}$, which was exponentially small for large δ.

Figure 55C:
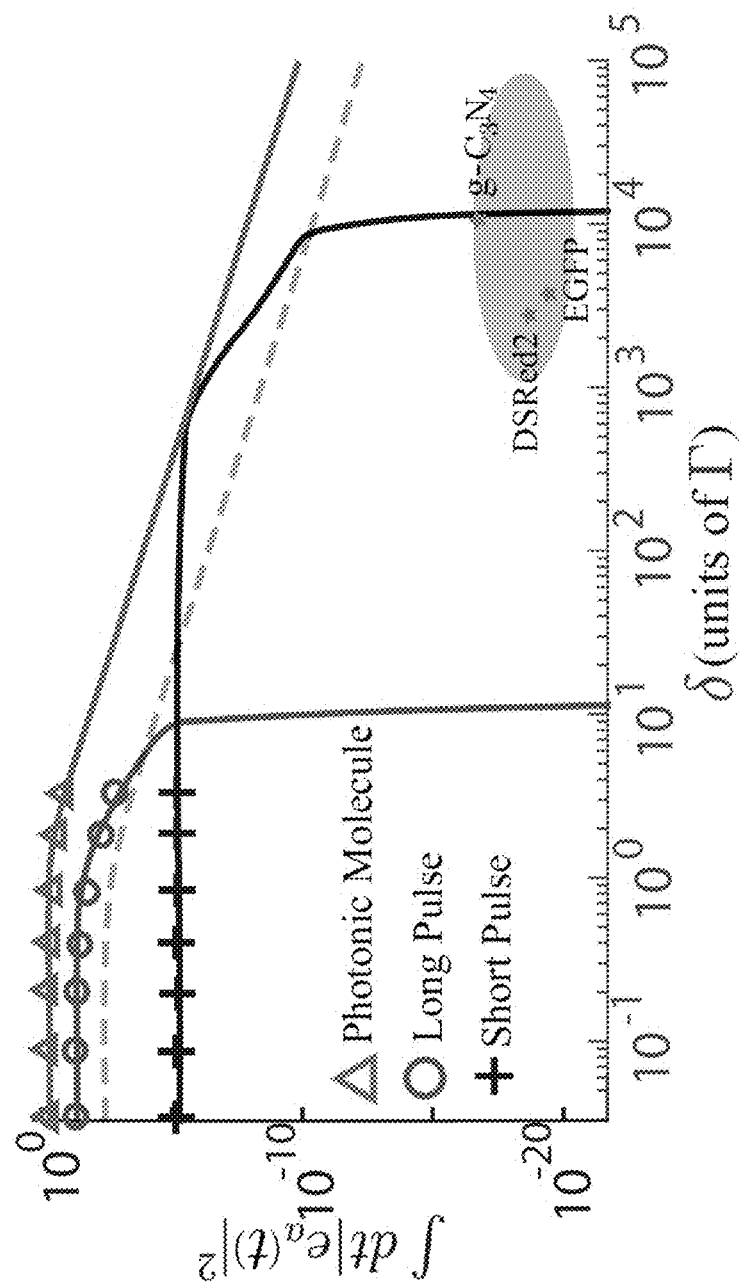
FIG. 55C is a graph summarizing numerical results of the excitation efficiency from the time frequency conjugate model (solid curves), overlaid with the small-detuning numerical results.

The TFC model facilitated the investigation of the excitation efficiency at large detuning limit that was beyond the ab-initio computational approach. FIG. 55C is a graph showing the excitation efficiency over a wide range of δ up to $10^5$ Γ for the three excitation schemes described in Ex. 1. The unknown constants K and N' were fixed by equating to the rigorous numerical results at only one point at δ=0. The excitation efficiencies given by the numerical results and by the physical model agreed well throughout the small detuning limit range. The efficiency for the 1 ns long pulse decreased rapidly at around δ≈10Γ, while the efficiency for the 200 fs short pulse eventually diminishes at around δ≈$10^4$ Γ.

Referring again to FIG. 55C, the efficiency of three representative fluorophores (proteins EGFP and DSRed2, and quantum dot g-$C_3N_4$) were estimated from published experimental data. At δ≈$10^4$ Γ, the photonic molecules provide ≈$10^{12}$ orders of magnitude improvement in the excitation efficiency. The two-photon excitation per photon pair from a laser light using the semi-classical single-frequency second-order perturbation method was also calculated and is shown on the graph of FIG. 55C as a dashed curve. Although the semi-classical result approximated the long pulse result at small detuning limits, this result deviated from the long-pulse result at the large detuning limit. It is to be noted that although these results assumed a one-dimensional propagation channel, but may be applied equally well to three dimensional scattering scenarios. The excitation efficiency by the photonic molecules may be further enhanced when the correlation time τ decreases.

Example 3: Experimental Observations of Dual-Photon Molecules

The first experimental confirmation of 2-photon molecules made use of the cold atom system wherein the Rydberg blockade technique was employed to ensure only one atom was excited. Two alternative approaches for generating 2-photon molecules are described below that may be compatible with solid-state platforms.

Figure 56A:
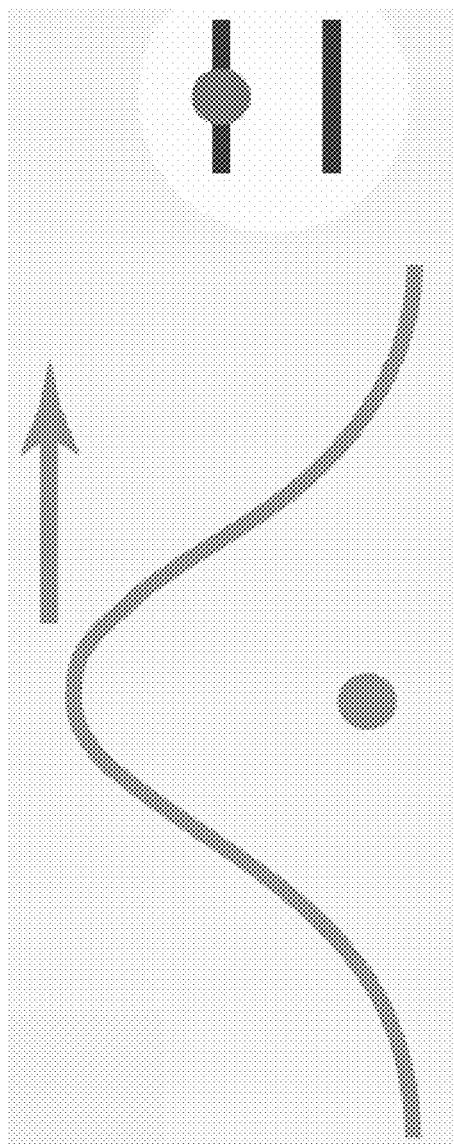
FIG. 56A is a schematic illustration of photonic molecule generation via stimulated emission in which a resonant Gaussian single photon is incident on an excited two-level quantum dot.
Figure 56B:
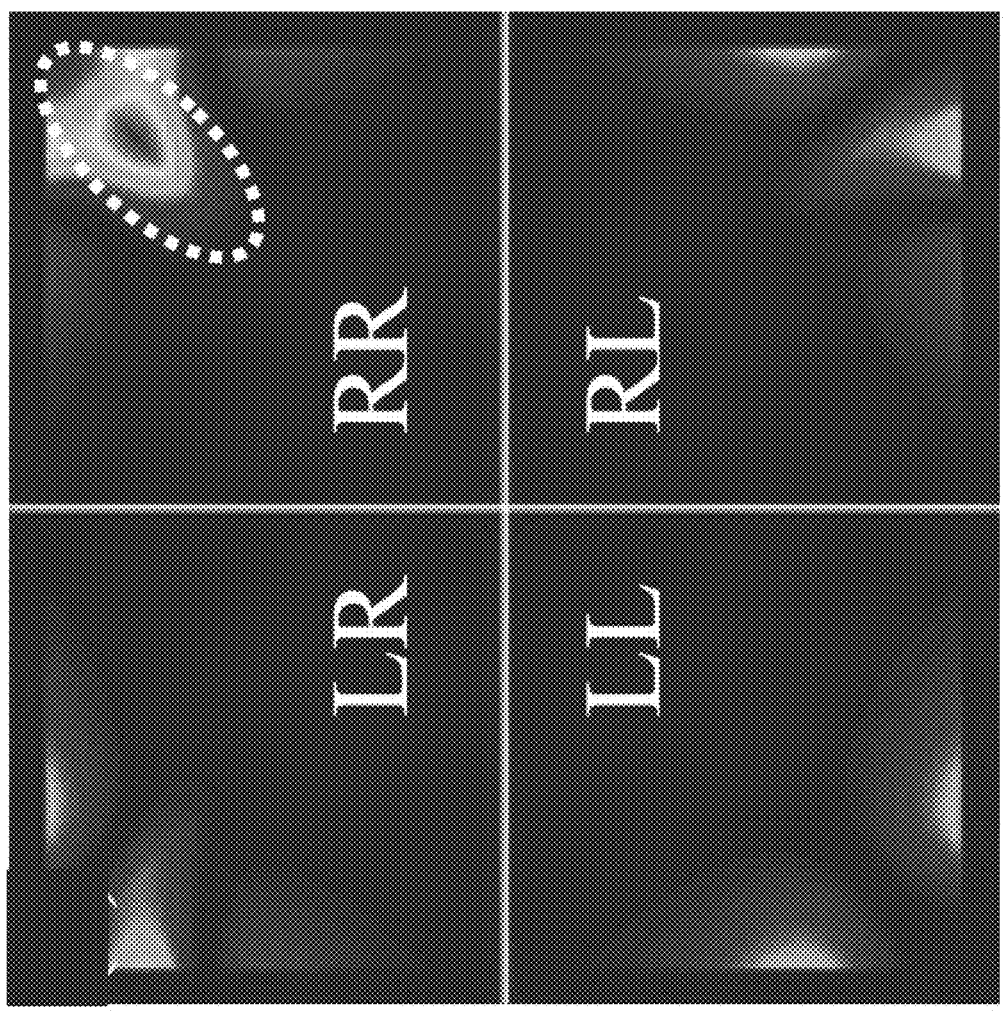
FIG. 56B is a map summarizing a two-photon probability density after scattering for T=0.6$\tau_0$.

The first approach to be assessed made use of a process similar to stimulated emission that included launching a flying single resonant Gaussian photon $$\phi_{in}(x) = (1/2\pi\sigma^2)^{1/4} e^{-\frac{(x-x_0)^2}{4\sigma^2}} e^{i\Omega x}$$

from the left to interact with an excited two-level quantum dot in a waveguide as illustrated schematically in FIG. 56A. FIG. 56B is a color map showing the two-photon probability density after scattering for the case T=0.6τ_0. Referring to FIG. 56B, the first quadrant (RR branch) depicts two transmitted (right-moving) photons to the right of the molecule, and the third quadrant (LL branch) describes two reflected (left-moving) photons to the left of the molecule. In terms of the complete set of the two-photon scattering states, i.e., the plane waves and the bound states, the wavefunction was numerically decomposed to find the weight of the generated photonic molecule state.

Figure 56C:
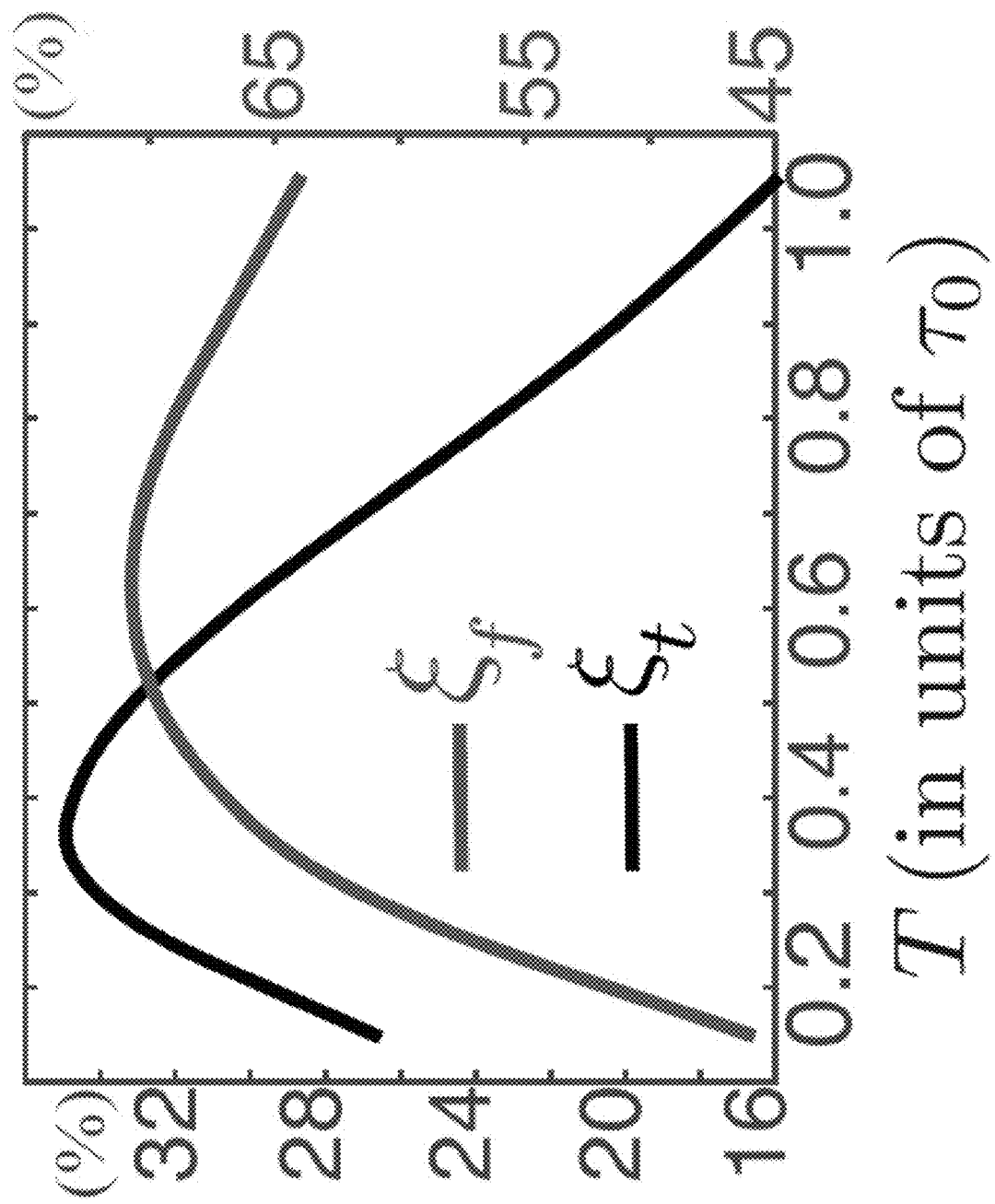
FIG. 56C is a graph summarizing a forward generation efficiency $\xi_t$ (black curve, left axis) and the total generation efficiency $\xi_f$ (red curve, right axis) of the stimulated emission approach illustrated schematically in FIG. 56A.

To quantify the generation efficiency of the photonic molecule, the forward generation efficiency was defined as:

$$\xi_f \equiv \frac{\int dE |\langle B_E | \Phi(t \to +\infty)\rangle RR|^2}{RR\langle \Phi(t \to +\infty) | \Phi(t \to +\infty)\rangle RR} \quad \text{Eqn. (7)}$$

where $|B_E\rangle$ was the photonic molecule state of total energy E and decay rate γ=Γ[1,2], and $|\Phi(t \to +\infty)\rangle$RR was the scattering wavefunction in the RR branch. The total generation efficiency $\xi_t$ was defined accordingly but with the entire state $|\Phi(t \to +\infty)\rangle$ used in the denominator. FIG. 56C is a graph showing both generation efficiencies $\xi_f$ and $\xi_t$ with varying single-photon coherence time T (via T=2σ/$v_g$). The maximum value of the forward efficiency (red curve) reached 71% when $T=0.6\tau_0$. The total efficiency (black curve) had a maximum value of 35% when $T=0.36\tau_0$. That is, for one unit input energy, a maximum of 0.35 units of energy in the form of photonic molecules may be obtained according to the results summarized in FIG. 56C.

Figure 56D:
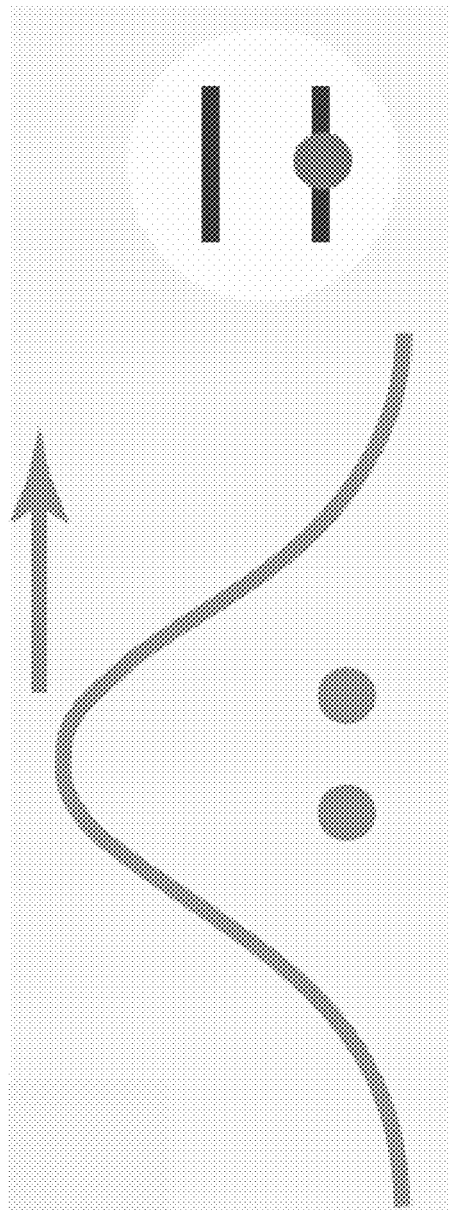
FIG. 56D is a schematic illustration of photonic molecule generation via the interaction of a two-photon Gaussian Fock state with a quantum dot at a ground state.
Figure 56E:
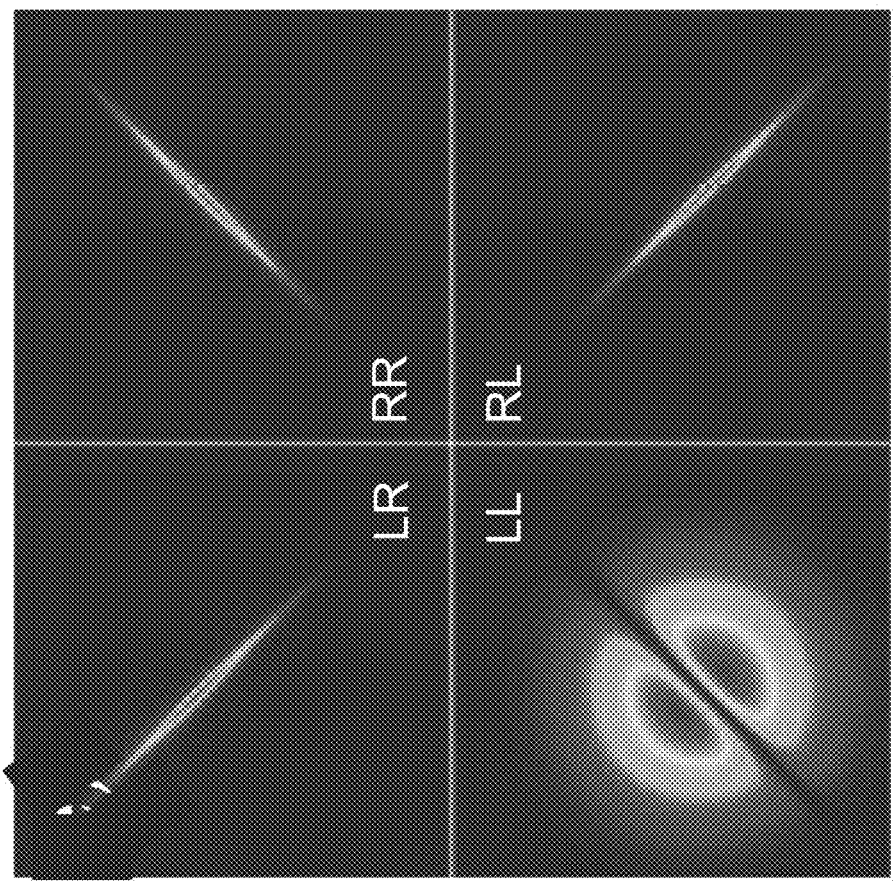
FIG. 56E is a map summarizing two-photon probability density after scattering for T=10$\tau_0$.
Figure 56F:
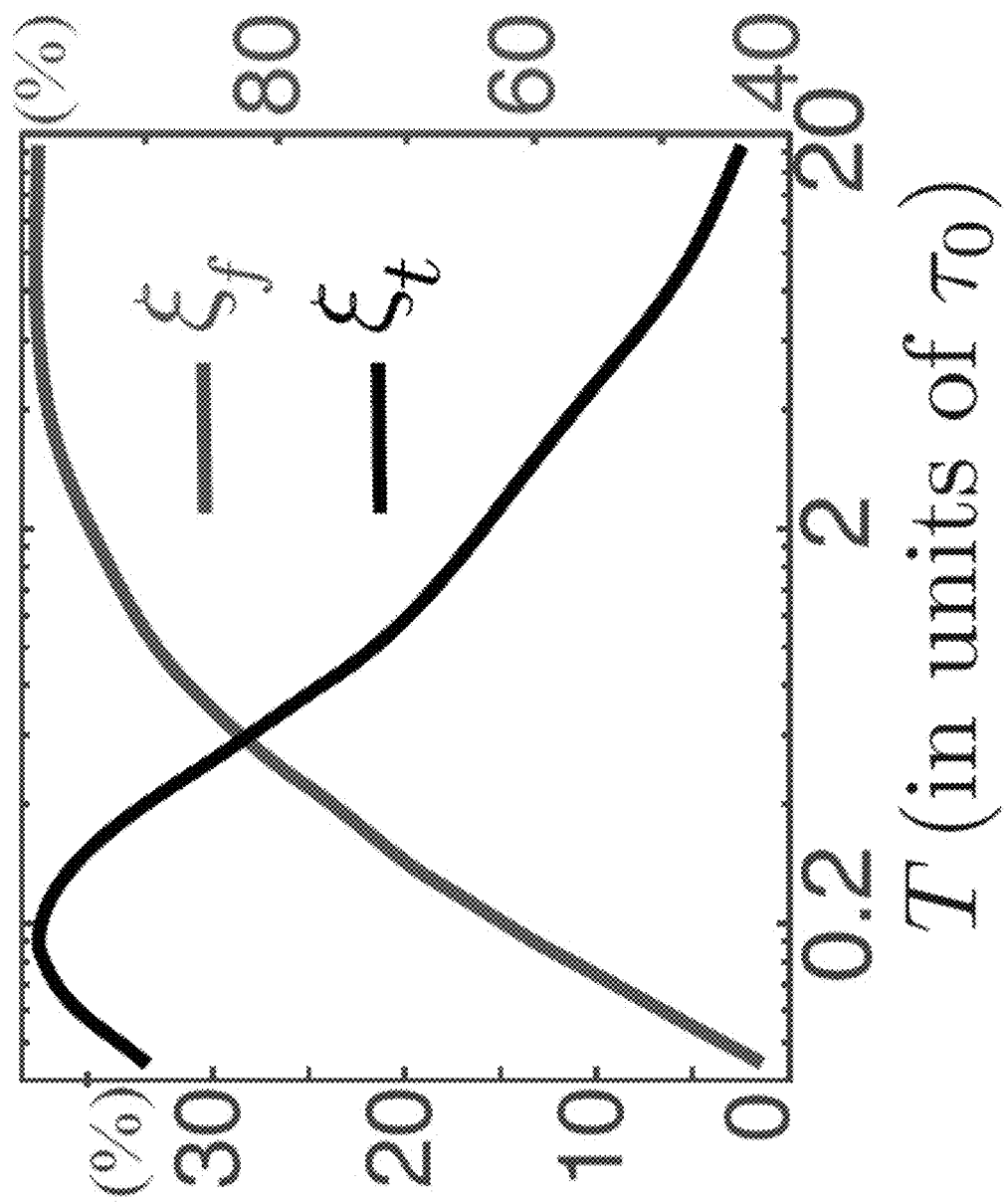
FIG. 56F is a graph showing forward generation efficiency $\xi_t$ (black curve, left axis) and the total generation efficiency $\xi_f$ (red curve, right axis) of the Fock state approach illustrated schematically in FIG. 56D.

A second approach to be assessed included injecting a two-photon Gaussian Fock state to interact with a quantum dot at the ground state as illustrated schematically in FIG. 56D. For a single incident resonant photon, the reflection coefficient is $\approx 1$. For an incident multi-photon Fock state, the transmitted photons could emerge at the output port, manifesting the quantum optical nonlinearity. FIG. 56E is a color map summarizing the two-photon probability density after scattering for the case $T=10\tau_0$. In the RR branch, the two-photon probability density was more pronounced along $x_1=x_2$, indicating that the two output photons were highly bunched and thus possessed high forward generation efficiency. The transmitted photons exhibited bunching and the reflected photons exhibited anti-bunching statistics. Due to the low degree of two-photon transmission, the total generation efficiency was limited. FIG. 56F is a graph showing both generation efficiencies $\xi_f$ and $\xi_t$ with varying single-photon coherence time T. As anticipated, for long coherence time, the forward generation efficiency (red curve) reached nearly 100%, indicating that in the RR branch, the output state was essentially a photonic molecule. On the other hand, the total generation efficiency (black curve) remained small at the long coherence time limit. The total efficiency attained a maximum value of $\approx 39\%$ at a shorter coherence time $T=0.18\tau_0$, which was approximately the same as in the stimulated emission scheme. As the correlation time of the generated photonic molecules was determined by the spontaneous emission time of the quantum emitter, photonic molecules with an ultrashort correlation time may be generated using ultra-fast (<11 ps) yet efficient sources of spontaneous emission that may further increase the excitation efficiency.

The results of these experiments demonstrated that the individual photonic molecules may enable efficient two-photon excitation, and may enhance the excitation performance per photon over the conventional ultrashort pulses. A coherent state of the photonic molecules may emerge in a multi-PM system, in which the photonic molecules may start overlapping and the photonic system may undergo a BEC transition (the correlation length $v_g\tau$ may be tunable by dispersion engineering the photonic group velocity $v_g$ within the gain medium). This coherent light source of PMs may enable highly efficient two-photon excitation microscopy in a continuous mode operation. Owing to the greatly enhanced nonlinear two-photon cross section of the fluorophores and to the longer coherence time of the photonic molecules, the instantaneous illuminating light intensity may be substantially lowered, which may further reduce the risk of photobleaching and photodamage at the focal volume. Additional multi-photon molecules, including, but not limited to three-photon molecules, four-photon molecules, and photonic molecules comprising larger numbers of photons may further enhance the excitation performance per photon for multi-photon excitation microscopy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A photonic molecule seeding source for producing a plurality of photonic molecules, the photonic molecule seeding source comprising:
    a waveguide comprising a first face and a second face, the waveguide further comprising at least one first dopant, each first dopant comprising an energy level transition corresponding to a first frequency, wherein the at least one first dopant is maintained at a population inverted state;
    a pump source operatively coupled to the first face of the waveguide, the pump source configured to deliver a laser pulse at the first frequency with a pulse coherence time T into the first face, wherein the pulse coherence time T is less than a correlation timer T of each photonic molecule; and
    a filter operatively coupled to the second face of the waveguide, the filter configured to block passage of a photon comprising the first frequency and to transmit a photonic molecule comprising an n-fold multiple of the first frequency, wherein n is the number of photons in the photonic molecule.

2. The photonic molecule seeding source of claim 1, wherein the filter comprises a second waveguide comprising at least one additional first dopant, wherein the at least one additional first dopant is maintained at a ground state.

3. The photonic molecule seeding source of claim 1, wherein the pulse coherence time T is less than 80% of the correlation time $\tau$.

4. The photonic molecule seeding source of claim 3, wherein the pulse coherence time T is less than 60% of the correlation time $\tau$.

5. The photonic molecule seeding source of claim 1, wherein the at least one first dopant and the at least one additional first dopant each comprise one of a quantum dot, an artificial atom, $Er^{3+}$, $[CrCl_6]^{3-}$, a chlorophyll, a silicon vacancy center, $NO_2$, cobalt cupferrate, vanadyl phthalocyanine, CM-$H_2$DCFDA, DAPI, and TMRE.

6. The photonic molecule seeding source of claim 2, wherein the waveguide and the second waveguide each comprise a gain medium formed from a solid-state semiconductor material.

7. A photonic molecule laser comprising:
    a photonic molecule seeding source, the photonic molecule seeding source configured to deliver a plurality of photonic molecules, each photonic molecule comprising a threshold bound state of n photons, each of the n photons having a first frequency, and each photonic molecule having a photonic molecule frequency equal to a second frequency; and
    a gain medium comprising a photonic molecule waveguide, the photonic molecule waveguide operatively coupled to the photonic molecule seeding source at one end, the photonic molecule waveguide further comprising at least one gain dopant, each gain dopant comprising an energy level transition corresponding to the second frequency, the second frequency comprising an n-fold multiple of the first frequency, wherein the at least one gain dopant is maintained at a population inverted state; and wherein the at least one gain dopant of the photonic molecule waveguide amplifies the number of photonic molecules via stimulated emission.

8. The photonic molecule laser of claim 7, wherein the photonic molecule seeding source comprises:
   a waveguide comprising a first face and a second face, the waveguide further comprising at least one first dopant, each first dopant comprising an energy level transition corresponding to the first frequency, wherein each first dopant is maintained at a population inverted state;
   a pump source operatively coupled to the first face of the waveguide, the pump source configured to deliver a laser pulse at the first frequency with a pulse coherence time T into the first face, wherein the pulse coherence time T is less than a correlation time $\tau$ of each photonic molecule; and
   a first filter operatively coupled to the second face of the waveguide, the first filter configured to block passage of a photon comprising the first frequency and to transmit a photonic molecule comprising an n-fold multiple of the first frequency, wherein n is the number of photons in the photonic molecule.

9. The photonic molecule laser of claim 8, wherein the pulse coherence time T is less than 80% of the correlation time $\tau$.

10. The photonic molecule laser of claim 9, wherein the pulse coherence time T is less than 60% of the correlation time $\tau$.

11. The photonic molecule laser of claim 9, wherein the photonic molecule waveguide further comprises a series of single-pass segments, each single-pass segment comprising a portion of the photonic molecule waveguide operatively coupled to each adjacent single-pass segment, each portion of the photonic molecule waveguide comprising at least one gain dopant maintained at the population inverted state.

12. The photonic molecule laser of claim 11, wherein a second filter is positioned between each adjacent pair of single-pass segments of the plurality of single-pass segments, each second filter configured to block passage of an individual photon with the first frequency and to transmit any photonic molecules with the photonic molecule frequency equal to the second frequency.

13. The photonic molecule laser of claim 12, wherein the photonic molecule waveguide, the first filter, and the second filter comprises a gain medium formed from a solid-state semiconductor material.

14. The photonic molecule laser of claim 12, wherein the at least one first dopant and the at least one gain dopant each comprise one of a quantum dot, an artificial atom, $Er^{3+}$, $[CrCl_6]^{3-}$, a chlorophyll, a silicon vacancy center, $NO_2$, cobalt cupferrate, vanadyl phthalocyanine, CM-$H_2$DCFDA, DAPI, and TMRE.

15. The photonic molecule laser of claim 7, further comprising a slow-light waveguide operatively attached to the first filter opposite the photonic molecule waveguide, the slow-light waveguide configured to decrease a size of the photonic molecule, wherein the size of the photonic molecule is directly proportional to a propagation speed of the photonic molecule.

16. The photonic molecule laser of claim 7, wherein the photonic molecule waveguide is positioned within a resonator, the resonator comprising a first reflector and a second reflector operatively coupled to opposite ends of the photonic molecule waveguide, wherein the first reflector and second reflector are configured to reflect exiting photonic molecules back into the gain medium for additional amplification by the at least one gain dopant.

* * * * *